(12) United States Patent
Azuma et al.

(10) Patent No.: US 11,086,604 B2
(45) Date of Patent: Aug. 10, 2021

(54) SOURCE CODE SPLITTING DEVICE, SOURCE CODE ANALYZING DEVICE, SOURCE CODE SPLITTING METHOD, AND COMPUTER READABLE MEDIUM

(71) Applicant: Mitsubishi Electric Corporation, Tokyo (JP)

(72) Inventors: Taishi Azuma, Tokyo (JP); Toshihiro Kobayashi, Tokyo (JP); Masaki Fujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/648,937

(22) PCT Filed: Oct. 25, 2018

(86) PCT No.: PCT/JP2018/039754
§ 371 (c)(1),
(2) Date: Mar. 19, 2020

(87) PCT Pub. No.: WO2019/102786
PCT Pub. Date: May 31, 2019

(65) Prior Publication Data
US 2020/0285452 A1    Sep. 10, 2020

(30) Foreign Application Priority Data
Nov. 21, 2017   (JP) .............................. JP2017-223514

(51) Int. Cl.
*G06F 9/44*    (2018.01)
*G06F 8/41*    (2018.01)
*G06F 8/71*    (2018.01)

(52) U.S. Cl.
CPC ................ *G06F 8/433* (2013.01); *G06F 8/71* (2013.01)

(58) Field of Classification Search
CPC .................................. G06F 8/433; G06F 8/71
(Continued)

(56) References Cited

U.S. PATENT DOCUMENTS 10,067,757 B2 *   9/2018  Weber ....................... G06F 8/41
2013/0111438 A1   5/2013  Yoshimura et al.
(Continued)

FOREIGN PATENT DOCUMENTS

| JP | 2000298586 A | 10/2000 |
| JP | 2001325100 A | 11/2001 |

(Continued)

OTHER PUBLICATIONS

International Search Report (PCT/ISA/210) dated Dec. 11, 2018, by the Japan Patent Office as the International Searching Authority for International Application No. PCT/JP2018/039754.

*Primary Examiner* — Chuck O Kendall
(74) *Attorney, Agent, or Firm* — Buchanan Ingersoll & Rooney PC

(57) ABSTRACT

An extent of decrease in analysis accuracy caused by splitting a source code can be reduced. An influence identifying unit identifies, for each of two functions included in a source code as a target, influence degrees exerted over analysis of the source code when the two target functions are each split into separate split codes, as analysis influence degrees between the two target functions, from an information amount passed between the two target functions. A splitting unit splits the source code into a plurality of split codes such that a sum of the analysis influence degrees between the functions each being split into the separate split codes decreases.

14 Claims, 44 Drawing Sheets

(58) Field of Classification Search
USPC .................................................. 717/100–122
See application file for complete search history.

(56) References Cited

U.S. PATENT DOCUMENTS

| | | |
|---|---|---|
| 2015/0040105 A1 | 2/2015 | Abadi et al. |
| 2015/0355904 A1 | 12/2015 | Koreki et al. |
| 2016/0011956 A1 | 1/2016 | Abadi et al. |
| 2017/0185506 A1 | 6/2017 | Sun et al. |
| 2017/0235667 A1 | 8/2017 | Abadi et al. |

FOREIGN PATENT DOCUMENTS

| | | | |
|---|---|---|---|
| JP | 2006302135 | A | 11/2006 |
| JP | 2009245362 | A | 10/2009 |
| JP | 2010049489 | A | 3/2010 |
| JP | 2010198522 | A | 9/2010 |
| JP | 2012164024 | A | 8/2012 |
| JP | 2013015958 | A | 1/2013 |
| JP | 2014112325 | A | 6/2014 |
| JP | 2015035174 | A | 2/2015 |
| JP | 2015230582 | A | 12/2015 |
| JP | 2016133879 | A | 7/2016 |
| JP | 2016528622 | A | 9/2016 |
| JP | 2017117449 | A | 6/2017 |
| WO | 2012011145 | A1 | 1/2012 |

* cited by examiner

42: ARGUMENT INFORMATION TABLE

| ARGUMENT | DEPENDING SOURCE | DEPENDING DESTINATION | ARGUMENT TYPE | ARGUMENT TYPE BIT NUMBER |
|---|---|---|---|---|
| a | main | FuncA | bool | 1 |
| b | main | FuncA | char | 8 |
| c | main | FuncB | int | 16 |

43: ARGUMENT INFLUENCE TABLE

| DEPENDING SOURCE | DEPENDING DESTINATION | ANALYSIS INFLUENCE DEGREE |
|---|---|---|
| main | FuncA | 9 |
| main | FuncB | 16 |

Fig. 8
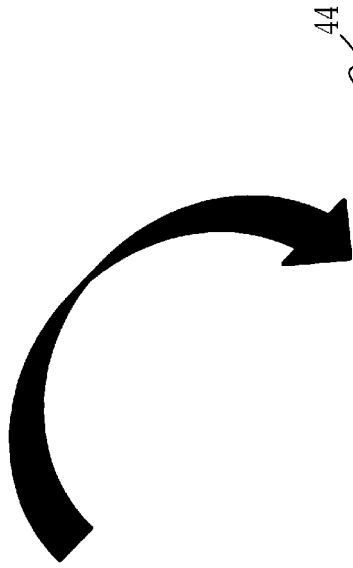
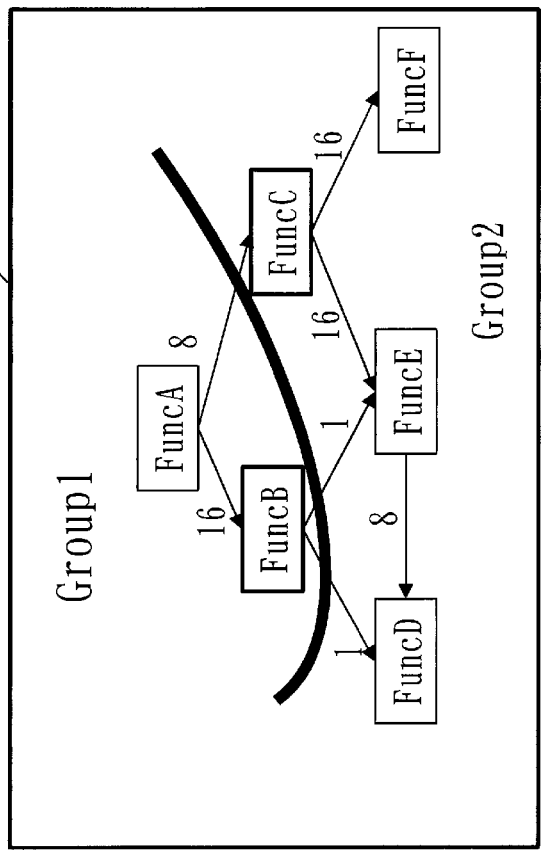
43: ARGUMENT INFLUENCE TABLE
| DEPENDING SOURCE | DEPENDING DESTINATION | ANALYSIS ACCURACY INFLUENCE DEGREE |
|---|---|---|
| FuncA | FuncB | 16 |
| FuncA | FuncC | 8 |
| FuncB | FuncD | 8 |
| FuncB | FuncE | 1 |
| FuncC | FuncE | 16 |
| FuncC | FuncF | 16 |
45: SPLITTING TABLE
| FUNCTION | GROUP OF SPLIT CODE |
|---|---|
| FuncA | Group1 |
| FuncB | Group1 |
| FuncC | Group2 |
| FuncD | Group2 |
| FuncE | Group2 |
| FuncF | Group2 |

46: GLOBAL VARIABLE TABLE

| GLOBAL VARIABLE | FuncA | FuncB | FuncC | DECLARATION TYPE | TYPE BIT NUMBER |
|---|---|---|---|---|---|
| globalA | ○ | ○ | | int | 16 |
| globalB | | ○ | ○ | char | 8 |
| globalC | ○ | | ○ | bool | 1 |

47: GLOBAL VARIABLE INFLUENCE TABLE

| REFERENCING FUNCTION 1 | REFERENCING FUNCTION 2 | ANALYSIS ACCURACY INFLUENCE DEGREE |
|---|---|---|
| FuncA | FuncB | 16 |
| FuncB | FuncC | 8 |
| FuncC | FuncA | 1 |

Fig. 20

43 : ARGUMENT INFLUENCE TABLE

| DEPENDING SOURCE | DEPENDING DESTINATION | ANALYSIS INFLUENCE DEGREE |
|---|---|---|
| FuncA | FuncB | 16 |
| FuncA | FuncC | 8 |

47 : GLOBAL VARIABLE INFLUENCE TABLE

| REFERENCING FUNCTION 1 | REFERENCING FUNCTION 2 | ANALYSIS INFLUENCE DEGREE |
|---|---|---|
| FuncA | FuncB | 16 |
| FuncB | FuncC | 8 |
| FuncC | FuncA | 1 |

48 : INTEGRAL INFLUENCE TABLE

| REFERENCING FUNCTION 1 | REFERENCING FUNCTION 2 | ANALYSIS INFLUENCE DEGREE |
|---|---|---|
| FuncA | FuncB | 32 |
| FuncA | FuncC | 9 |
| FuncB | FuncC | 8 |

Fig. 23

43: ARGUMENT INFLUENCE TABLE

| DEPENDING SOURCE | DEPENDING DESTINATION | ANALYSIS INFLUENCE DEGREE | HIERARCHICAL INFLUENCE DEGREE | NEW ANALYSIS INFLUENCE DEGREE |
|---|---|---|---|---|
| FuncA | FuncB | 16 | 16 | 32 |
| FuncA | FuncC | 16 | 1 | 17 |
| FuncB | FuncD | 8 | 0 | 8 |
| FuncB | FuncE | 8 | 0 | 8 |
| FuncC | FuncF | 1 | 0 | 1 |

Fig. 27

| NAME (FUNCTION NAME/GLOBAL VARIABLE NAME) | REFERENCING FUNCTION | REFERENCED FUNCTION |
|---|---|---|
| funcA () | funcB () funcD () | funcC () |
| funcB () | funcE () | funcA () funcF () |
| funcC () | funcA () | funcG () |
| ... | ... | ... |
| funcN () | funcX () | funcY () |
| ... | ... | ... |
| g_valA | — | funcA () |
| ... | ... | ... |
| g_valN | — | funcN () |
| ... | ... | ... |

Fig. 28

| NAME (FUNCTION NAME/GLOBAL VARIABLE NAME) | VALUE RANGE OF ARGUMENT | | | VALUE RANGE OF RETURN VALUE/GLOBAL VARIABLE | | ANALYSIS RESULT | |
|---|---|---|---|---|---|---|---|
| | ARGUMENT NAME | min | MAX | min | MAX | LINE NUMBER | RESULT |
| funcA () | arg1 | 5 | 10 | | | 1 | SECURE |
| | arg2 | -10 | 10 | | | ... | ... |
| | | | | | 10 | n | UNPROVED |
| funcB () | arg1 | 100 | 200 | | | 1 | SECURE |
| | | | | -100 | 100 | ... | ... |
| | | | | | | n | RISKY |
| ... | ... | ... | ... | ... | ... | ... | ... |
| funcN () | arg1 | 10 | 100 | | | 1 | SECURE |
| | | | | 200 | 1000 | ... | ... |
| | | | | | | n | UNPROVED |
| g_valA | — | — | — | -10 | 10 | — | — |
| ... | ... | ... | ... | ... | ... | ... | ... |
| g_valN | — | — | — | 50 | 500 | — | — |
| ... | ... | ... | ... | ... | ... | ... | ... |

Fig. 29

```
                          SOURCE CODE                              ~30
─────────────────────────────────────────────────────────────────
 int funcA(arg1, arg2)   ~32A        char funcC(arg1)      ~32B
 {                                   {
    :                                   :
   resB = funcB(b1);  /*b1:-5...5*/    return retvalC;  /*0...1 */
   resC = funcC(c1);  /*c1:5...10*/
    :                                }
   return retvalA;   /*0...100 */
                                     char funcD(arg1)
 }                                   {
                                        :
 int funcB(arg1)                       resA = funcA(a1, a2); / *a1:0...100*/
 {                                                          / *a2:-100...100*/
    :                                   :
   int tmp = g_valA;                   return retvalD; /*10...100 */
    :
   return retvalB;  /*10...50 */      }
 }
```

Fig. 31

| NAME (FUNCTION NAME/GLOBAL VARIABLE NAME) | REFERENCING FUNCTION | REFERENCED FUNCTION |
|---|---|---|
| funcA | funcB<br>funcD | funcD |
| funcB | | funcA |
| funcC | funcA | funcA |
| funcD | | |
| g_valA | — | funcB |

Fig. 34

| NAME<br>(FUNCTION NAME/GLOBAL VARIABLE NAME) | REFERENCING FUNCTION | REFERENCED FUNCTION |
|---|---|---|
| funcA | funcB<br>funcC | funcD |
| funcB | – | funcA |
| g_valA | – | funcB |

Fig. 36

| NAME (FUNCTION NAME/GLOBAL VARIABLE NAME) | VALUE RANGE OF ARGUMENT | | | VALUE RANGE OF RETURN VALUE/GLOBAL VARIABLE | | ANALYSIS RESULT | |
|---|---|---|---|---|---|---|---|
| | ARGUMENT NAME | min | MAX | min | MAX | LINE NUMBER | RESULT |
| funcA () | arg1 | 0 | 100 | | | — | — |
| | arg2 | -100 | 100 | | | ... | ... |
| funcB () | arg1 | — | — | | — | — | — |
| | | | | | | ... | ... |
| funcC () | arg1 | — | — | 0 | 1 | 55 | SECURE |
| | | | | | | ... | ... |
| | | | | | | 312 | UNPROVED |
| funcC () | arg1 | — | — | 10 | 100 | 322 | RISKY |
| | | | | | | ... | ... |
| | | | | | | 500 | SECURE |
| g_valA | — | — | — | — | — | — | — |

Fig. 38

| NAME (FUNCTION NAME/GLOBAL VARIABLE NAME) | VALUE RANGE OF ARGUMENT | | | VALUE RANGE OF RETURN VALUE/GLOBAL VARIABLE | | ANALYSIS RESULT | |
|---|---|---|---|---|---|---|---|
| | ARGUMENT NAME | min | MAX | min | MAX | LINE NUMBER | DETERMINATION |
| funcA () | arg1 | 0 | 100 | | | 11 | SECURE |
| | arg2 | -100 | 100 | 0 | 100 | ⋮ | ⋮ |
| | | | | | | 82 | UNPROVED |
| funcB () | arg1 | -5 | 5 | | | 86 | SECURE |
| | | | | 10 | 50 | ⋮ | ⋮ |
| | | | | | | 112 | SECURE |
| funcC () | arg1 | 5 | 10 | | | 55 | SECURE |
| | | | | 0 | 1 | ⋮ | ⋮ |
| | | | | | | 312 | UNPROVED |
| funcD () | arg1 | — | — | | | 322 | RISKY |
| | | | | 10 | 100 | ⋮ | ⋮ |
| | | | | | | 500 | SECURE |
| g_valA | — | — | — | 10 | 50 | — | — |

Fig. 42

| NAME (FUNCTION NAME/GLOBAL VARIABLE NAME) | VALUE RANGE OF ARGUMENT | | | VALUE RANGE OF RETURN VALUE/GLOBAL VARIABLE | | ANALYSIS RESULT | | ANALYSIS ACCURACY |
|---|---|---|---|---|---|---|---|---|
| | ARGUMENT NAME | min | MAX | min | MAX | LINE NUMBER | DETERMINATION | |
| funcA () | arg1 | 0 | 100 | 0 | 100 | 11 | SECURE | 30% |
| | arg2 | -100 | 100 | | | : | : | |
| | | | | | | 82 | UNPROVED | |
| funcB () | arg1 | -5 | 5 | 10 | 50 | 86 | SECURE | 20% |
| | | | | | | : | : | |
| | | | | | | 112 | SECURE | |
| funcC () | arg1 | 5 | 10 | 0 | 1 | 55 | SECURE | 50% |
| | | | | | | : | : | |
| | | | | | | 312 | UNPROVED | |
| funcD () | arg1 | — | — | 10 | 100 | 322 | RISKY | 30% |
| | | | | | | : | : | |
| | | | | | | 500 | SECURE | |
| g_valA | — | — | — | 10 | 50 | — | — | — |

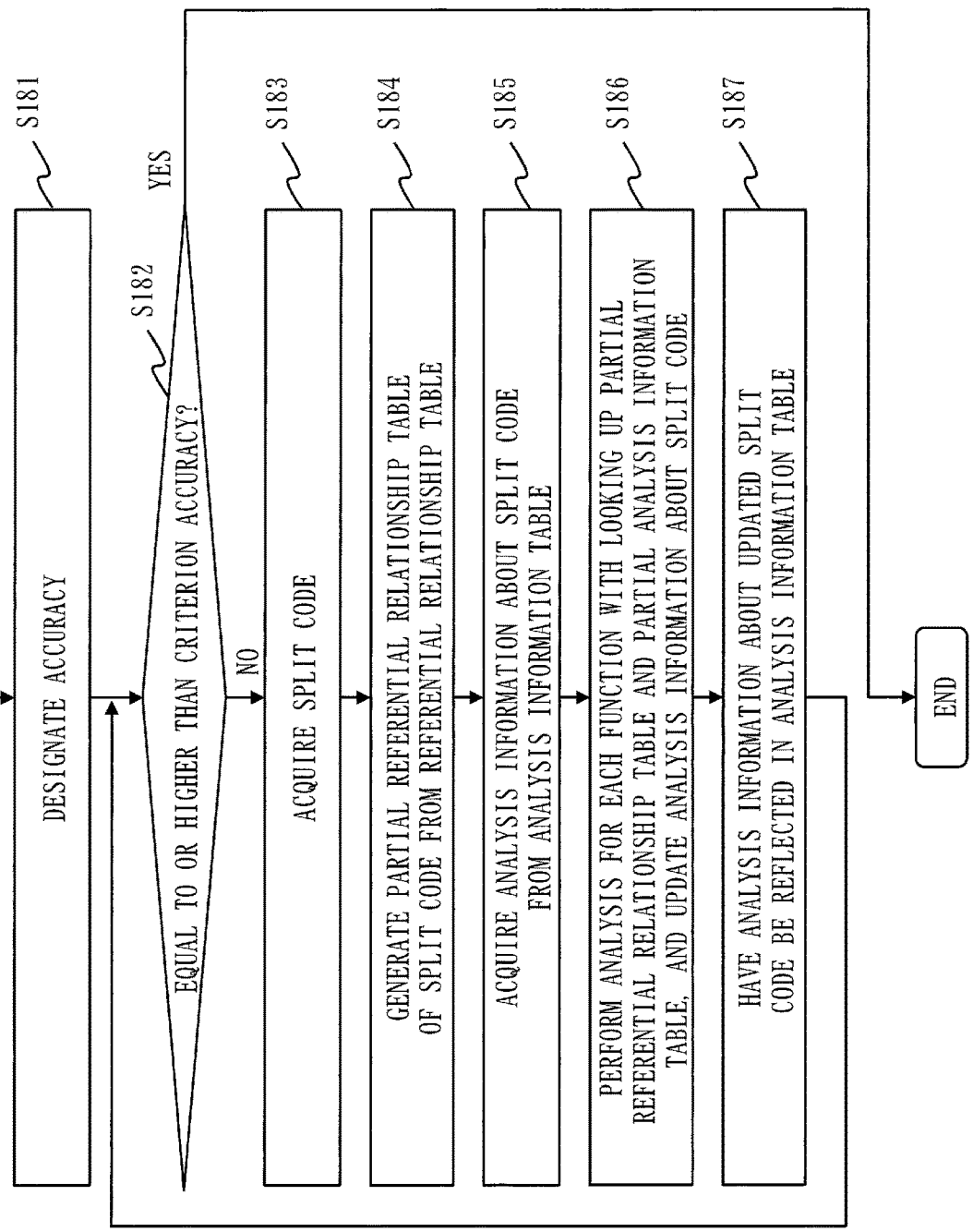

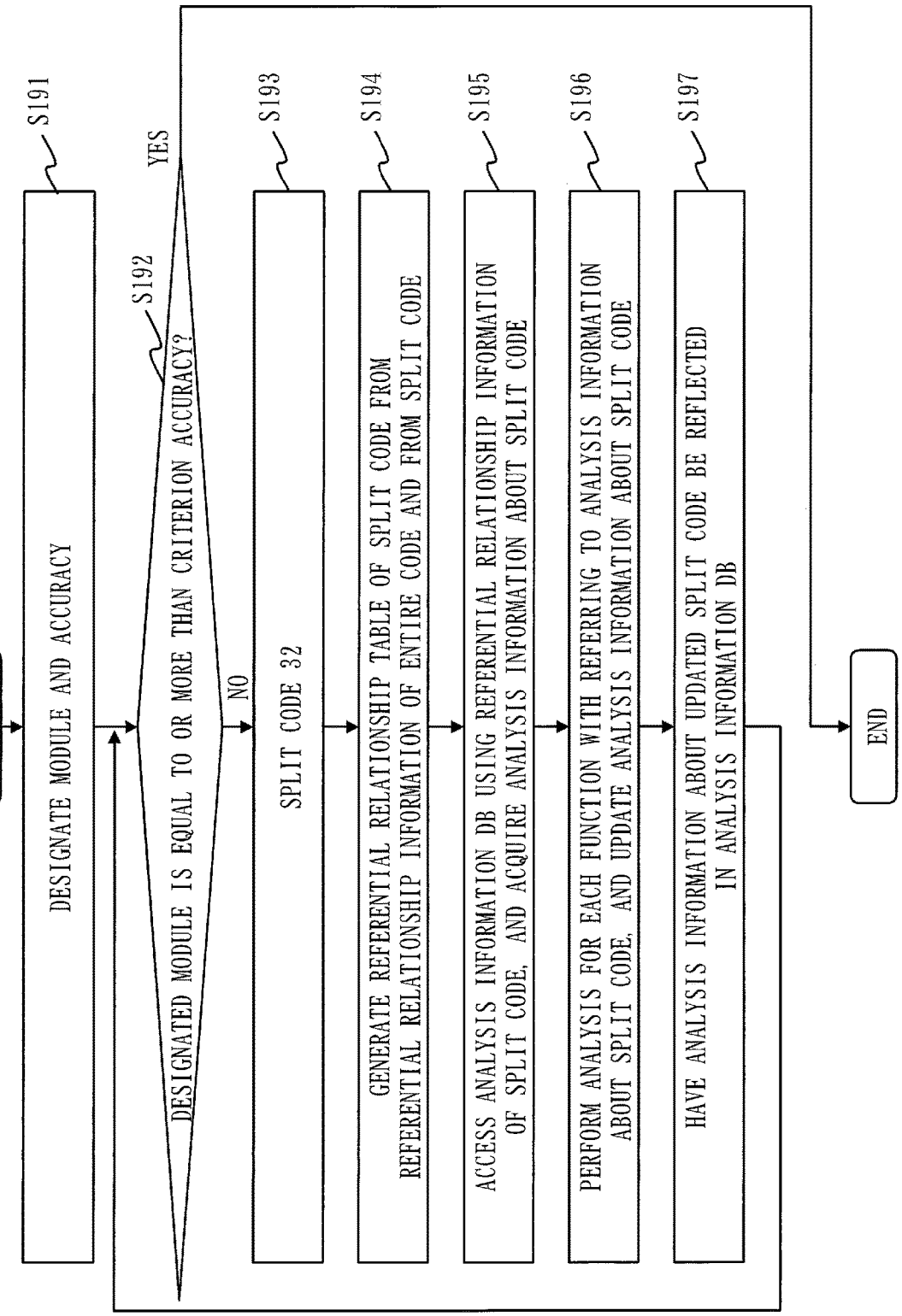

SOURCE CODE SPLITTING DEVICE, SOURCE CODE ANALYZING DEVICE, SOURCE CODE SPLITTING METHOD, AND COMPUTER READABLE MEDIUM

TECHNICAL FIELD

The present invention relates to a splitting technique for a source code in a computer system.

BACKGROUND ART

As the scale of software to be developed increases, it is becoming difficult to understand software configuration. Accordingly, there is an increasing risk that an influence range of a changed portion in the software cannot be grasped. In order to reduce this risk degree, conventionally, an error portion is detected with using a source code analysis tool, thereby efficiently detecting a defect.

As a source code analysis tool, a dynamic analysis tool capable of detecting a runtime error by designating a parameter such as a function argument and a global variable is known.

However, if an attempt is made to analyze the entire source code at once, sometimes the source code cannot be analyzed or the analysis may stretch over a long time, because the scale of the analysis-target software is excessively large. In such a case, a huge source code being the analysis target is split into analyzable software components, and analysis is performed on each software component.

Patent Literature 1 discloses a technique of determining a portion where a source code is to be split, using metrics information of software components and the number of dependency relationships among software components. Thus, in Patent Literature 1, the complexity of the source code as an analysis target is reduced, and the source code is split into analyzable software components.

CITATION LIST

Patent Literature

Patent Literature 1: JP 2017-117449

SUMMARY OF INVENTION

Technical Problem

When a source code is split, dependency relationships among split software components are lost, and analysis accuracy decreases.

It is an objective of the present invention to reduce an extent of decrease in analysis accuracy caused by splitting the source code.

Solution to Problem

A source code splitting device according to the present invention includes:

an influence identifying unit to identify, for each of two functions included in a source code as a target, influence degrees exerted over analysis of the source code when the two target functions are each split into separate split codes, as analysis influence degrees between the two target functions, from an information amount passed between the two target functions; and a splitting unit to split the source code into a plurality of split codes based on the analysis influence degrees identified by the influence identifying unit.

Advantageous Effects of Invention

According to the present invention, analysis influence degrees between functions are identified from an information amount passed between the functions, and a source code is split into a plurality of split codes based on the identified analysis influence degrees. As a result, it is possible to reduce an extent of decrease in analysis accuracy caused by splitting the source code.

BRIEF DESCRIPTION OF DRAWINGS

FIG. 8 is an explanatory diagram of the splitting process according to Embodiment 1.

FIG. 20 is an explanatory diagram of the influence integrating process according to Modification 4.

FIG. 23 is a diagram indicating an argument influence table 43 according to Embodiment 3.

FIG. 27 is a configuration diagram of a referential relationship table 531 according to Embodiment 5.

FIG. 28 is a configuration diagram of an analysis information table 532 according to Embodiment 5.

FIG. 29 is a diagram illustrating an example of a source code 30 and examples of a split code 32 according to Embodiment 5.

FIG. 31 is an explanatory diagram of the reference identifying process according to Embodiment 5.

FIG. 34 is an explanatory diagram of the structure identifying process according to Embodiment 5.

FIG. 36 is an explanatory diagram of the information acquiring process according to Embodiment 5.

FIG. 38 is an explanatory diagram of the analyzing process according to Embodiment 5.

FIG. 42 is a configuration diagram of an analysis information table 532 according to Embodiment 7.

FIG. 43 is a flowchart illustrating overall behavior of the source code analyzing device 50 according to Embodiment 7.

FIG. 44 is a flowchart illustrating overall behavior of a source code analyzing device 50 according to Embodiment 8.

DESCRIPTION OF EMBODIMENTS

Embodiment 1

*Description of Configuration*

Figure 1:
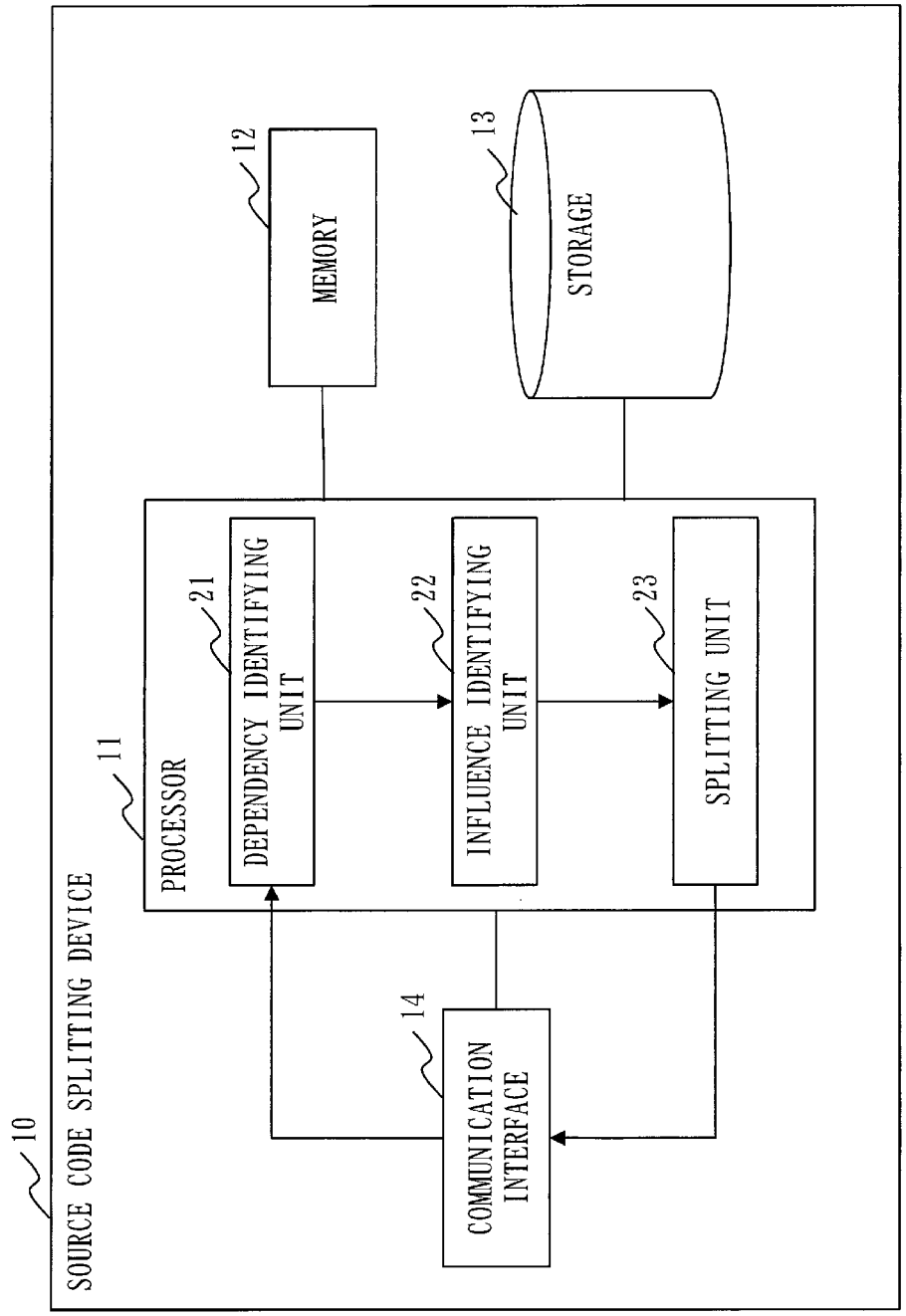
FIG. 1 is a configuration diagram of a source code splitting device 10 according to Embodiment 1.

A configuration of a source code splitting device 10 according to Embodiment 1 will be described with referring to FIG. 1.

The source code splitting device 10 is a computer.

The source code splitting device 10 is provided with hardware devices which are a processor 11, a memory 12, a storage 13, and a communication interface 14. The processor 11 is connected to the other hardware devices via a signal line and controls these other hardware devices.

The processor 11 is an integrated circuit (IC) which performs processing. Specific examples of the processor 11 are a central processing unit (CPU), a digital signal processor (DSP), and a graphics processing unit (GPU).

The memory 12 is a storage device which stores data temporarily. Specific examples of the memory 12 are a static random access memory (SRAM) and a dynamic random access memory (DRAM).

The storage 13 is a storage device which keeps data. A specific example of the storage 13 is a hard disk drive (HDD). The storage 13 may be a portable recording medium such as a secure digital (SD; registered trademark) memory card, a compact flash (CF; registered trademark), a NAND flash, a flexible disk, an optical disk, a compact disk, a blu-ray (registered trademark) disk, and a digital versatile disk (DVD).

The communication interface 14 is an interface for communicating with an external device. Specific examples of the communication interface 14 are an Ethernet (registered trademark) port, a universal serial bus (USB) port, and a high-definition multimedia interface (HDMI; registered trademark) port.

The source code splitting device 10 is provided with a dependency identifying unit 21, an influence identifying unit 22, and a splitting unit 23, as feature constituent elements. Features of the feature constituent elements of the source code splitting device 10 are implemented by software.

A program that implements the features of the feature constituent elements of the source code splitting device 10 is stored in the storage 13. This program is read into the memory 12 by the processor 11 and executed by the processor 11. Thus, the features of the feature constituent elements of the source code splitting device 10 are implemented.

FIG. 1 illustrates only one processor 11. However, there may be a plurality of processors 11. The plurality of processors 11 may cooperate to execute the program that implements the individual features.

*Description of Behavior*

Behavior of the source code splitting device 10 according to Embodiment 1 will be described with referring to FIGS. 2 to 8.

The behavior of the source code splitting device 10 according to Embodiment 1 corresponds to a source code splitting method according to Embodiment 1. The behavior of the source code splitting device 10 according to Embodiment 1 also corresponds to a process of a source code splitting program according to Embodiment 1.

Overall behavior of the source code splitting device 10 according to Embodiment 1 will be described with referring to FIG. 2.

Figure 2:
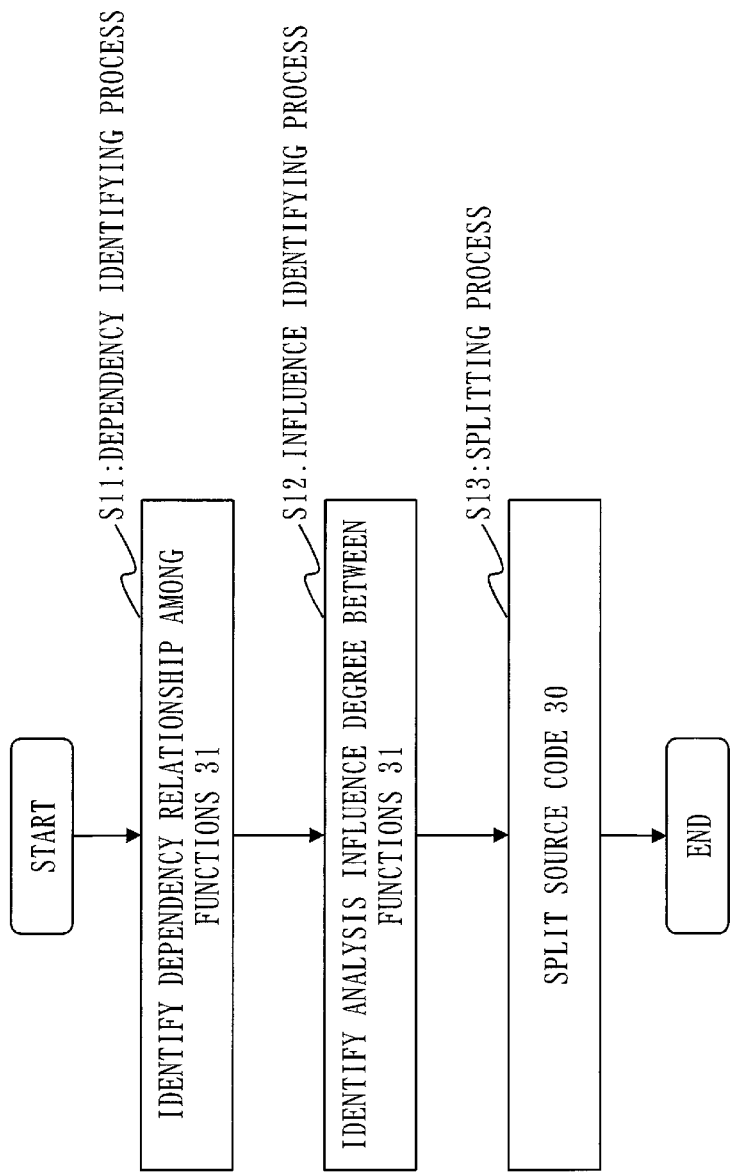
FIG. 2 is a flowchart illustrating overall behavior of the source code splitting device 10 according to Embodiment 1.

(Step S11 of FIG. 2: Dependency Identifying Process)

With respect to a plurality of functions 31 included in a source code 30, the dependency identifying unit 21 identifies dependency relationships among the functions 31 based on passing of arguments among the functions 31.

Figure 3:
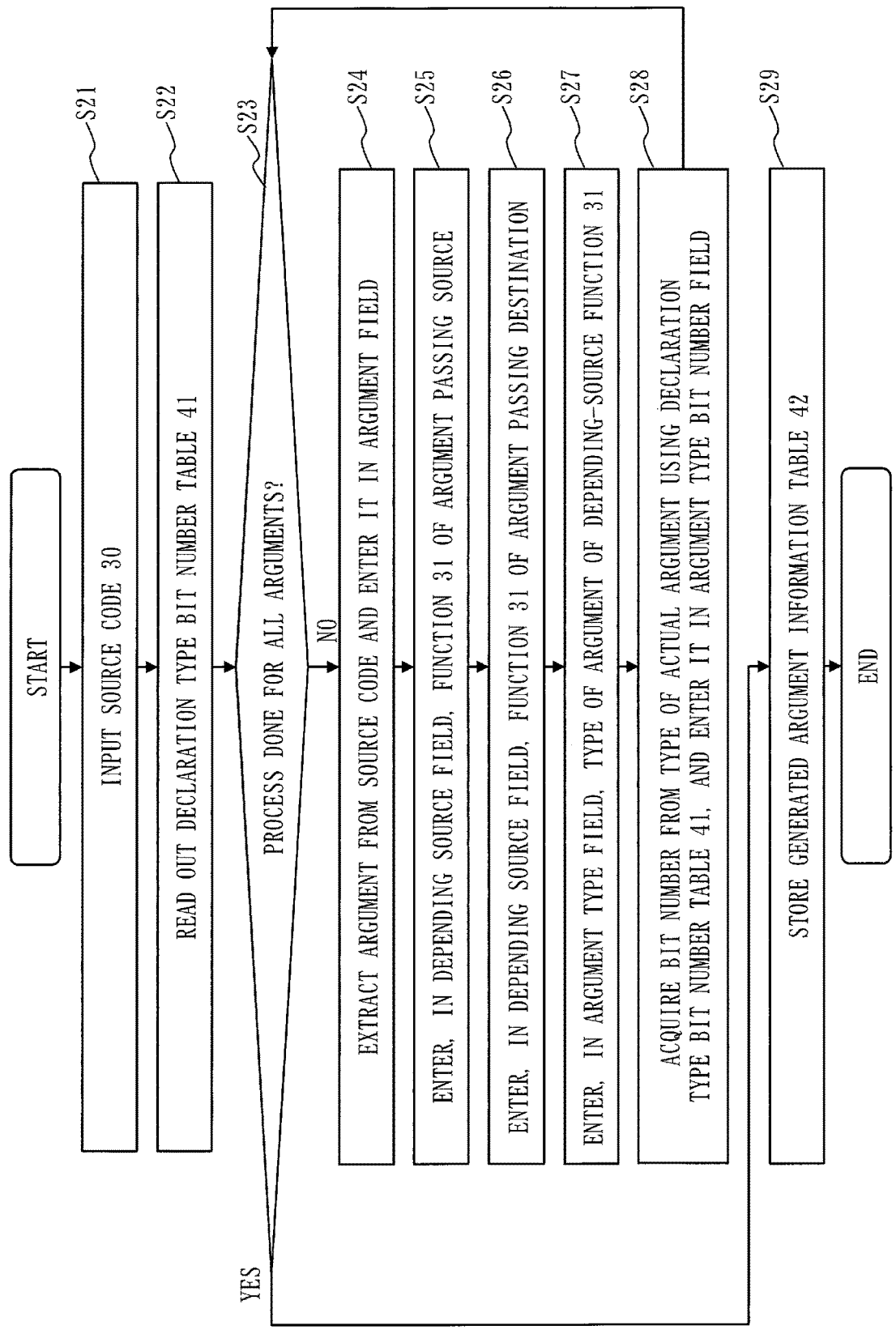
FIG. 3 is a flowchart of a dependency identifying process according to Embodiment 1.
Figure 4:
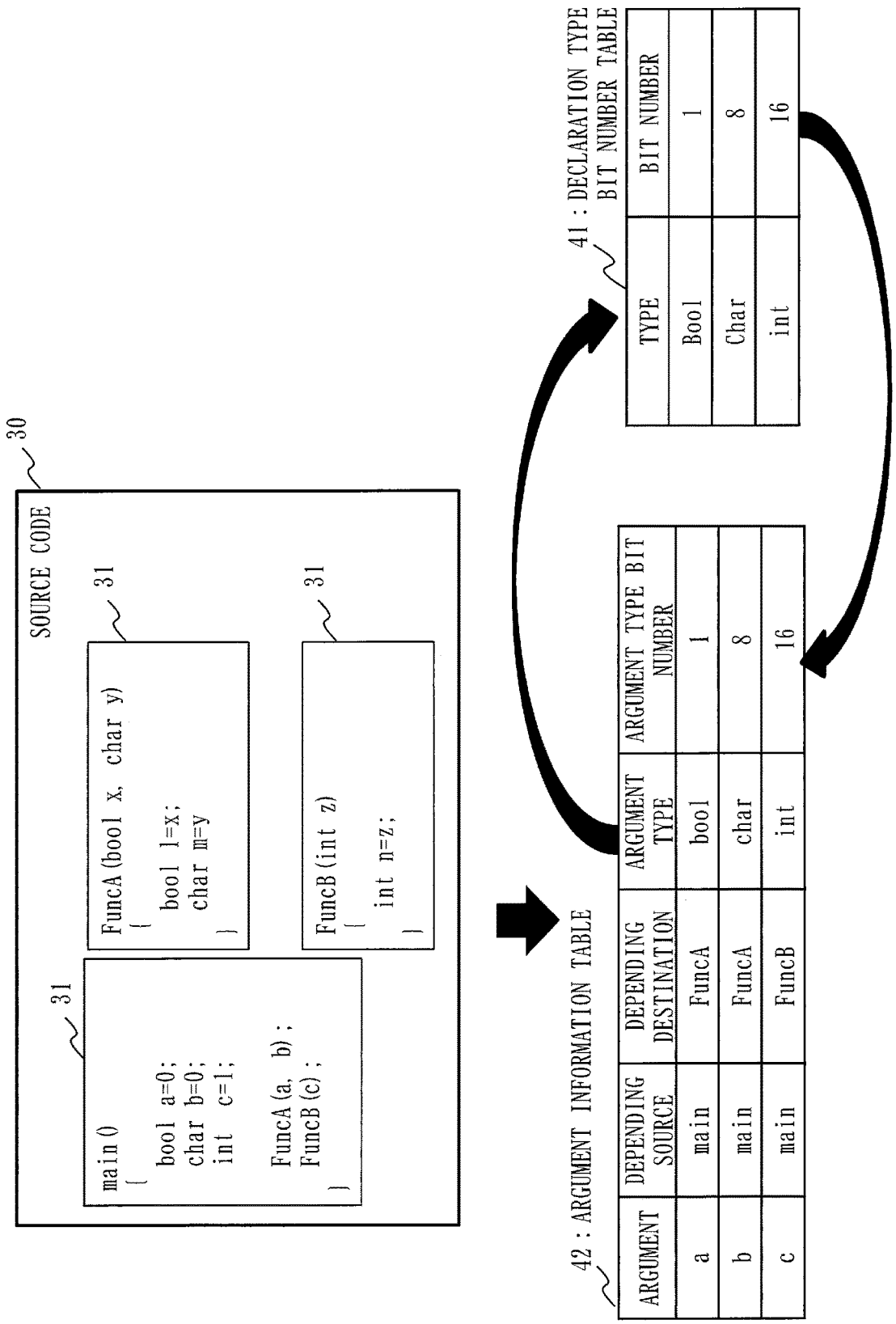
FIG. 4 is an explanatory diagram of the dependency identifying process according to Embodiment 1.

A dependency identifying process according to Embodiment 1 will be described with referring to FIGS. 3 and 4.

In step S21, the dependency identifying unit 21 accepts as input the analysis-target source code 30 via the communication interface 14.

In step S22, the dependency identifying unit 21 reads out a declaration type bit number table 41 from the storage 13. The declaration type bit number table 41 is data in which a type of variable and a bit number used for this type are associated with each other. Assume that the declaration type bit number table 41 is stored in the storage 13 in advance.

In step S23, the dependency identifying unit 21 determines whether or not the process is done for all the arguments included in the source code 30 accepted in step S21. If there is an argument for which the process is not done yet, the dependency identifying unit 21 advances the process to step S24. If the process is done for all the arguments, the dependency identifying unit 21 advances the process to step S29.

In step S24, the dependency identifying unit 21 extracts, from the source code 30, an argument for which the process is not done yet, and takes it as a target argument. The dependency identifying unit 21 enters, in an argument field of an argument information table 42, the target argument. In step S25, the dependency identifying unit 21 enters, in a depending source field of the argument information table 42, a function 31 of a passing source of the target argument. In step S26, the dependency identifying unit 21 enters, in a depending destination field of the argument information table 42, a function 31 of a passing destination of the target argument. In step S27, the dependency identifying unit 21 enters, in an argument type field of the argument information table 42, a type of the target argument defined by the function 31 of the passing source of the target argument. In step S28, the dependency identifying unit 21 looks up the declaration type bit number table 41 to identify a bit number used for the type of the target argument, and enters, in an argument type bit number field of the argument information table 42, the identified bit number.

For example, when the target argument is argument "a", "main" is entered in the depending source field, "FuncA" is entered in the depending destination field, "bool" is entered in the argument type field, and "1" is entered in the argument type bit number field.

In step S29, the dependency identifying unit 21 stores, in the storage 13, the argument information table 42 generated by processing from step S24 to step S28.

(Step S12 of FIG. 2: Influence Identifying Process)

The influence identifying unit 22, for each of two functions 31 included in the source code 30 and having a dependency relationship with each other, as a target, identifies analysis influence degrees between the two target functions 31 from an information amount passed between the two target functions 31. The analysis influence degrees are influence degrees exerted over analysis accuracy of the source code 30 when the two target functions 31 are each split into separate split codes 32.

Figure 5:
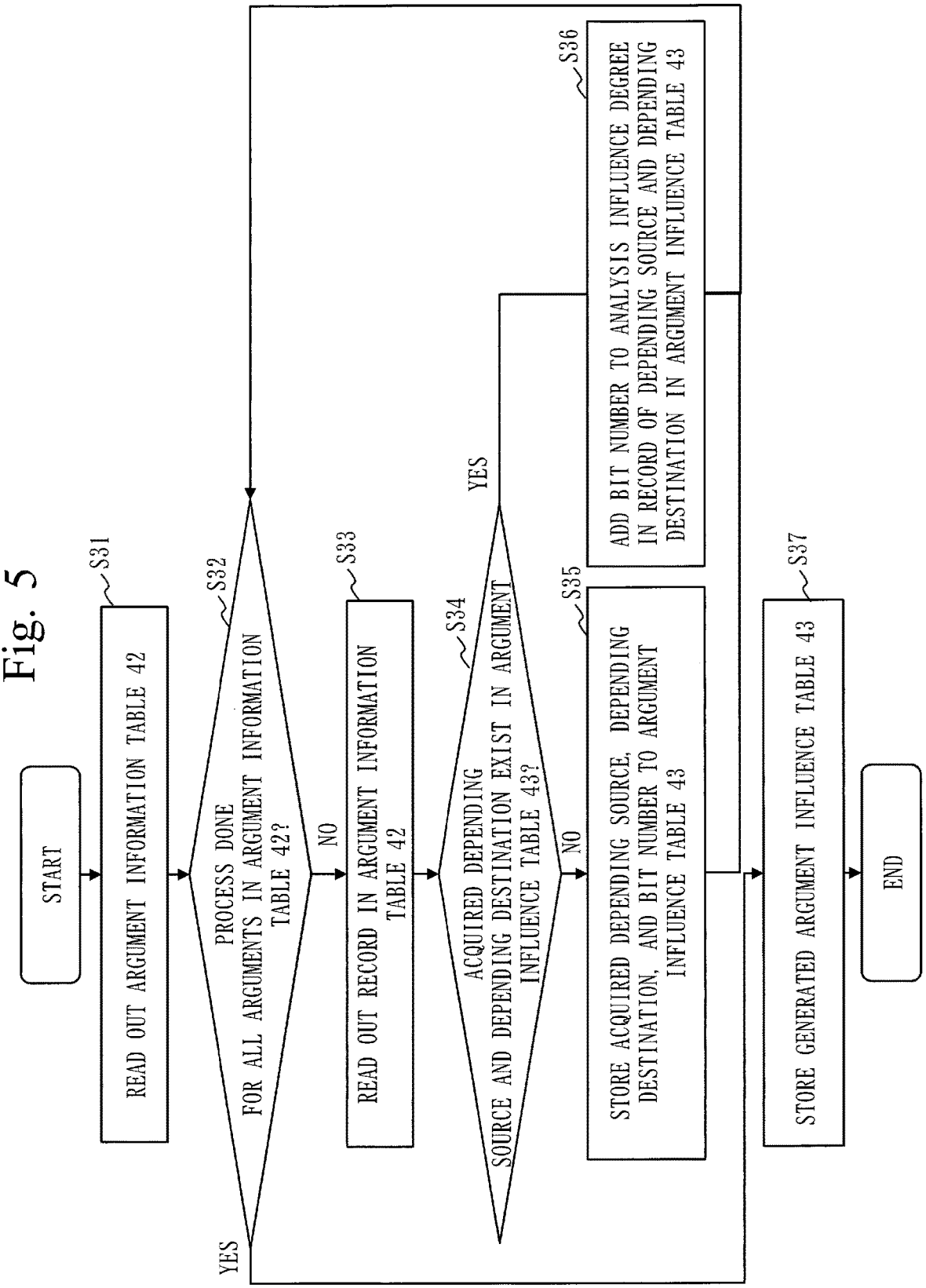
FIG. 5 is a flowchart of an influence identifying process according to Embodiment 1.
Figure 6:
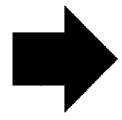
FIG. 6 is an explanatory diagram of an influence identifying process according to Embodiment 1.

An influence identifying process according to Embodiment 1 will be described with referring to FIGS. 5 and 6.

In step S31, the influence identifying unit 22 reads out the argument information table 42 generated in step S11 from the storage 13.

In step S32, the influence identifying unit 22 determines whether or not the process is done for all the arguments included in the argument information table 42. If there is an argument for which the process is not done yet, the influence identifying unit 22 advances the process to step S33. If the process is done for all the arguments, the influence identifying unit 22 advances the process to step S37.

In step S33, the influence identifying unit 22 reads out a record on the argument for which the process is not done yet, from the argument information table 42. In step S34, the influence identifying unit 22 determines whether or not a pair of a depending source and a depending destination in the record read out in step S33 exists in an argument influence table 43. If the pair of the depending source and the depending destination does not exist in the argument influence table 43, the influence identifying unit 22 advances the process to step S35. If the pair of the depending source and the depending destination exists in the argument influence table 43, the influence identifying unit 22 advances the process to step S36.

In step S35, the influence identifying unit 22 enters, in a depending source and a depending destination of the argument influence table 43, the depending source and the depending destination, respectively, in the record read out in step S33. The influence identifying unit 22 also enters, in an analysis influence degree in the argument influence table 43, a bit number in the record read out in step S33.

In step S36, the influence identifying unit 22 identifies, in the argument influence table 43, a record corresponding to the pair of the depending source and the depending destination in the record read out in step S33. The influence identifying unit 22 adds the bit number in the record read out in step S33 to the analysis influence degree in the identified record in the argument influence table 43.

Accordingly, in the argument influence table 43, an analysis influence degree of a record having, for example, a depending source "main" and a depending destination FuncA is 9, which is a sum of bit number "1" in a record of the argument "a" and a bit number "8" in a record of an argument "b" in the argument information table 42. An argument is information passed between functions, and a bit number of the argument is an information amount passed between the functions. Hence, the sum of the bit numbers of passed arguments is taken as the analysis influence degree. The larger the analysis influence degree, the larger the influence exerted over the analysis accuracy.

In step S37, the influence identifying unit 22 stores, in the storage 13, the argument influence table 43 generated by processing from step S34 to step S36.

(Step S13 of FIG. 2: Splitting Process)

The splitting unit 23 splits the source code 30 into a plurality of split codes 32 based on the analysis influence degree identified in step S12.

Figure 7:
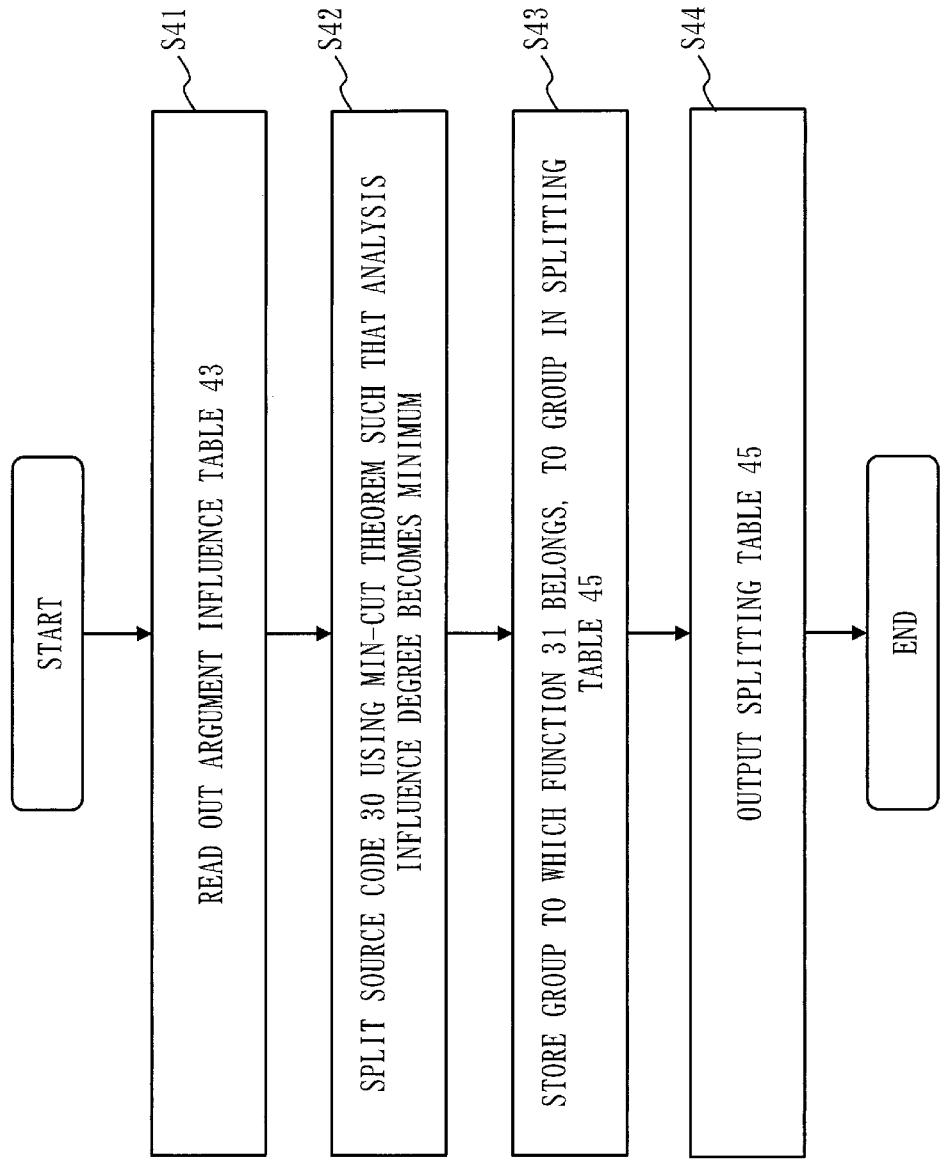
FIG. 7 is a flowchart of a splitting process according to Embodiment 1.

A splitting process according to Embodiment 1 will be described with referring to FIGS. 7 and 8.

In step S41, the splitting unit 23 reads out, from the storage 13, the argument influence table 43 generated in step S12. Referring to the argument influence table 43, with taking each function 31 as a node, a graph 44 can be created by drawing an arrow from a depending source node to a depending destination node and allocating an analysis influence degree as a cost of each arrow.

In step S42, the splitting unit 23 splits the source code 30 into the plurality of split codes 32 using the min-cut theorem. As a result, the source code 30 can be split into the plurality of split codes 32 such that a sum of the analysis influence degrees becomes the minimum.

Concerning the splitting unit 23, it is assumed that a split number indicating how many split codes 32 the source code 30 is to be split into is designated or set in advance via the communication interface 14. When the split number is 3 or more, the splitting unit 23 may repeatedly perform splitting that uses the min-cut theorem.

In step S43, the splitting unit 23 enters, in a splitting table 45, the functions 31 included in the argument influence table 43. For each function 31, the splitting unit 23 enters the group of split codes 32 the function 31 belongs to. In step S44, the splitting unit 23 outputs the splitting table 45 generated in step S43, via the communication interface 14.

\*\*\*Effect of Embodiment 1\*\*\*

As described above, the source code splitting device 10 according to Embodiment 1 identifies analysis influence degrees between the functions 31 from an information amount passed between the functions 31, and splits each source code 30 into a plurality of split codes 32 based on the identified analysis influence degrees. Hence, it is possible to reduce an extent of decrease in analysis accuracy caused by splitting the source code 30.

Figure 9:
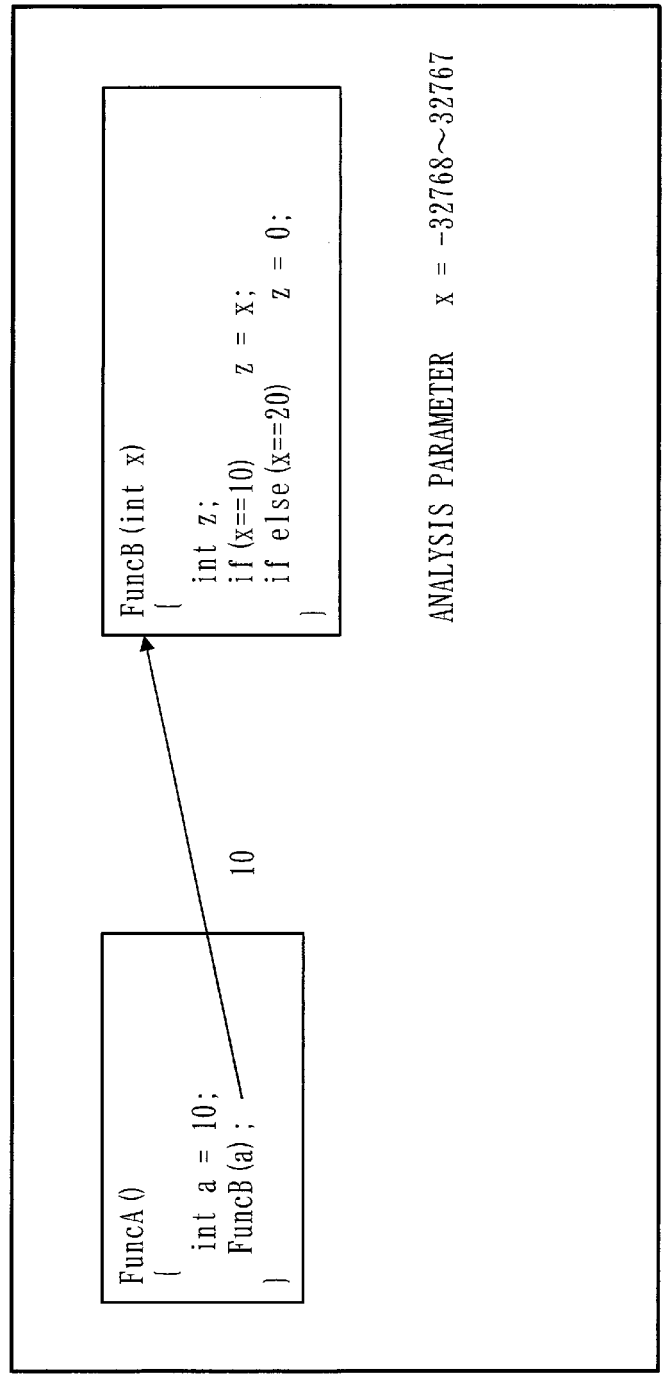
FIG. 9 is an explanatory diagram of an effect of Embodiment 1.

If there is a dependency relationship between FuncA and FuncB as illustrated in FIG. 9, argument value 10 is passed from FuncA to FuncB. In FuncB, only a to-be-executed line:

if (x==10) z=x;
is the analysis target. If, however, the dependency relationship between FuncA and FuncB lacks, argument value 10 is not passed from FuncA to FuncB, and accordingly x becomes an undetermined value in function FuncB. In this case, in order to analyze a runtime error, the analysis is performed while changing the parameter within a width (−32768 to 32767) of the value that the argument x can take. At this time, a line:
if else (x==20) z=0;
which should not originally be an analysis target is also executed and accordingly is an analysis target. Thus, 0 is assigned to z.

In this manner, when the source code 30 is split into the plurality of split codes 32, analysis accuracy may decrease. However, as the source code splitting device 10 according to Embodiment 1 can perform appropriate splitting, it is possible to reduce an extent of decrease in analysis accuracy caused by splitting the source code 30.

*Other Configurations*
<Modification 1>

In Embodiment 1, the bit number of the argument passed between the two functions 31 is taken as the information amount passed between the two functions. A return value passed from the depending destination function 31 to the depending source function 31 may also be taken as the information amount passed between the two functions. That is, the information amount passed between the two functions may be the bit number of at least either one of an argument and a return value between the two functions.

<Modification 2>

In Embodiment 1, the feature constituent elements are implemented by software. In Modification 2, feature constituent elements may be implemented by hardware. Modification 2 will be described regarding its difference from Embodiment 1.

Figure 10:
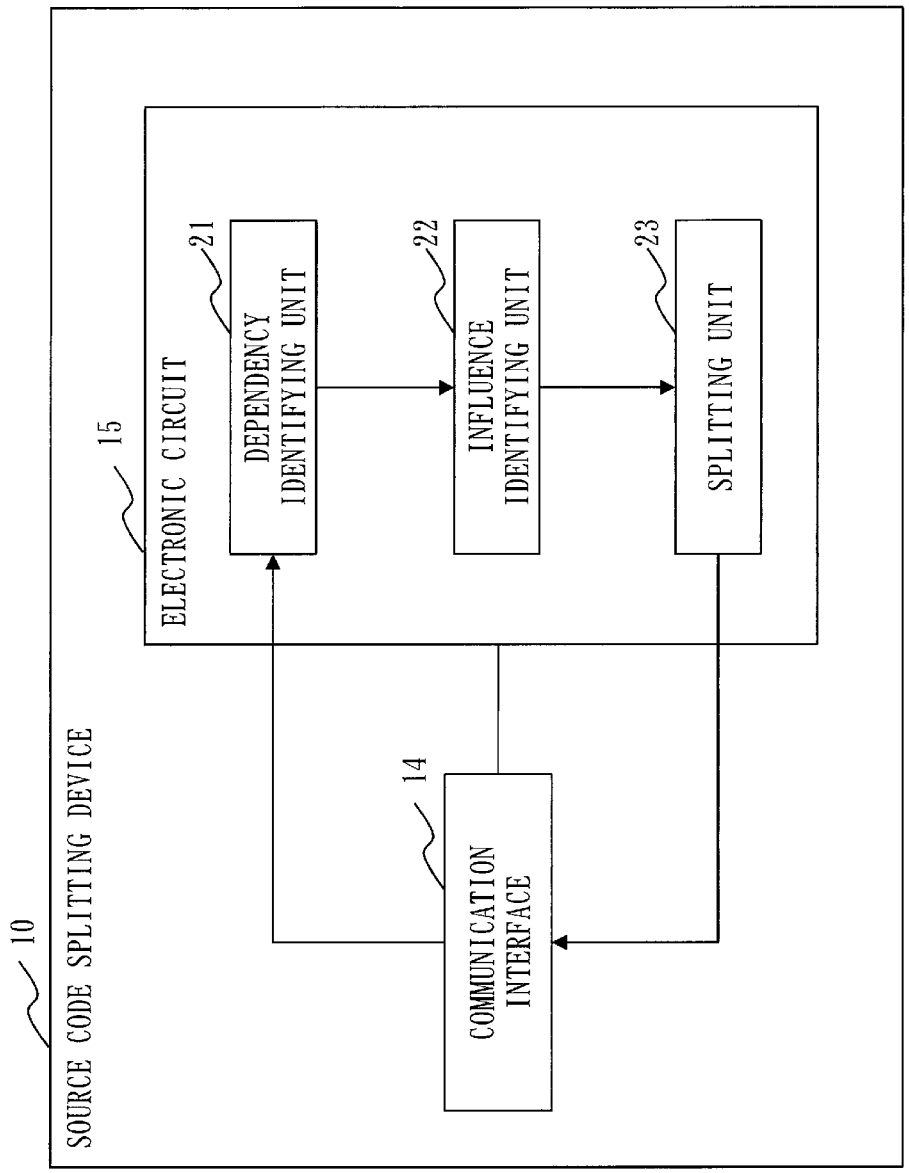
FIG. 10 is a configuration diagram of a source code splitting device 10 according to Modification 2.

A configuration of a source code splitting device 10 according to Modification 2 will be described with referring to FIG. 10.

When the feature constituent elements are implemented by hardware, the source code splitting device 10 is provided with an electronic circuit 15 in place of a processor 11, a memory 12, and a storage 13. The electronic circuit 15 is a dedicated circuit that implements features of the feature constituent elements, a feature of the memory 12, and a feature of the storage 13.

It is assumed that the electronic circuit 15 is a single circuit, a composite circuit, a programmed processor, a parallel-programmed processor, a logic IC, a gate array (GA), an application specific integrated circuit (ASIC), or a field-programmable gate array (FPGA).

The feature constituent elements may be implemented by one electronic circuit 15, or by distribution over a plurality of electronic circuits 15.

<Modification 3>

In Modification 3, some feature constituent elements may be implemented by hardware and the other feature constituent elements may be implemented by software.

A processor 11, a memory 12, a storage 13, and an electronic circuit 15 are referred to as processing circuitry. That is, features of the feature constituent elements are implemented by the processing circuitry.

Embodiment 2

An analysis influence degree is identified with considering a global variable. This is where Embodiment 2 is different from Embodiment 1. In Embodiment 2, this difference will be described, and a description on the same points will be omitted.

*Description of Configuration*

A configuration of a source code splitting device 10 according to Embodiment 2 will be described with referring to FIG. 11.

The source code splitting device 10 is provided with a global variable identifying unit 24 in place of a dependency identifying unit 21. This is where this source code splitting device 10 is different from the source code splitting device 10 illustrated in FIG. 1.

*Description of Behavior*

Behavior of the source code splitting device 10 according to Embodiment 2 will be described with referring to FIGS. 12 to 16.

Overall behavior of the source code splitting device 10 according to Embodiment 2 will now be described with referring to FIG. 12.

Figure 12:
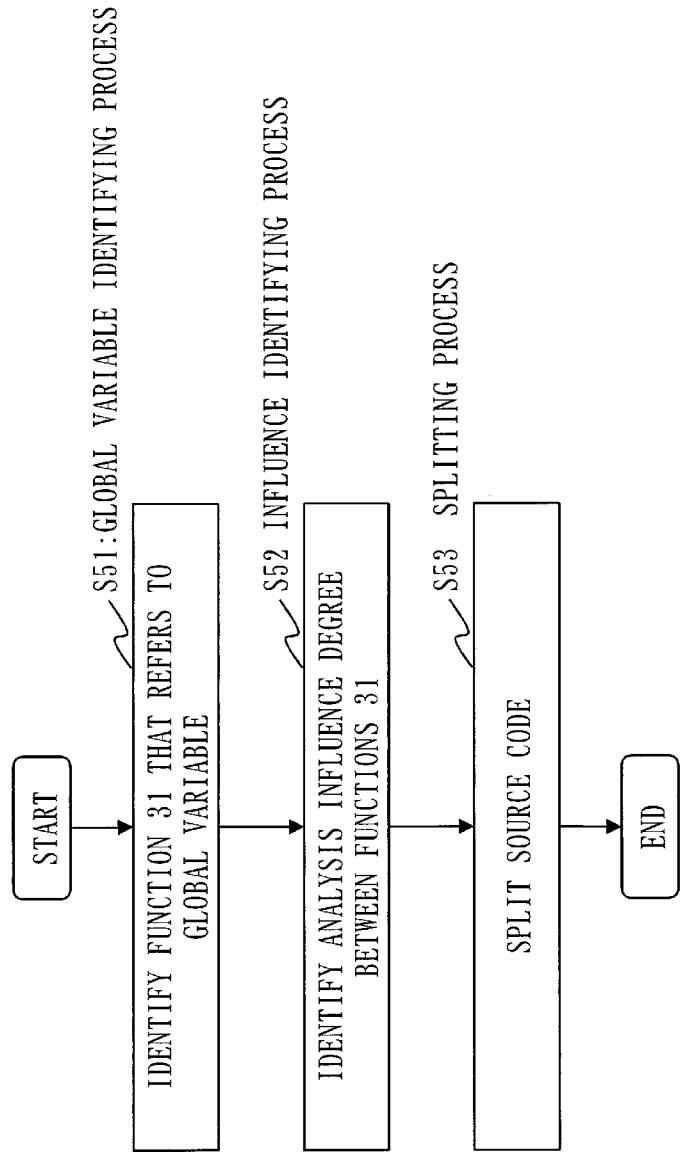
FIG. 12 is a flowchart illustrating overall behavior of the source code splitting device 10 according to Embodiment 2.

(Step S51 of FIG. 12: Global Variable Identifying Process)

Concerning a plurality of global variables included in a source code 30, the global variable identifying unit 24 identifies a function 31 that refers to each global variable.

Figure 13:
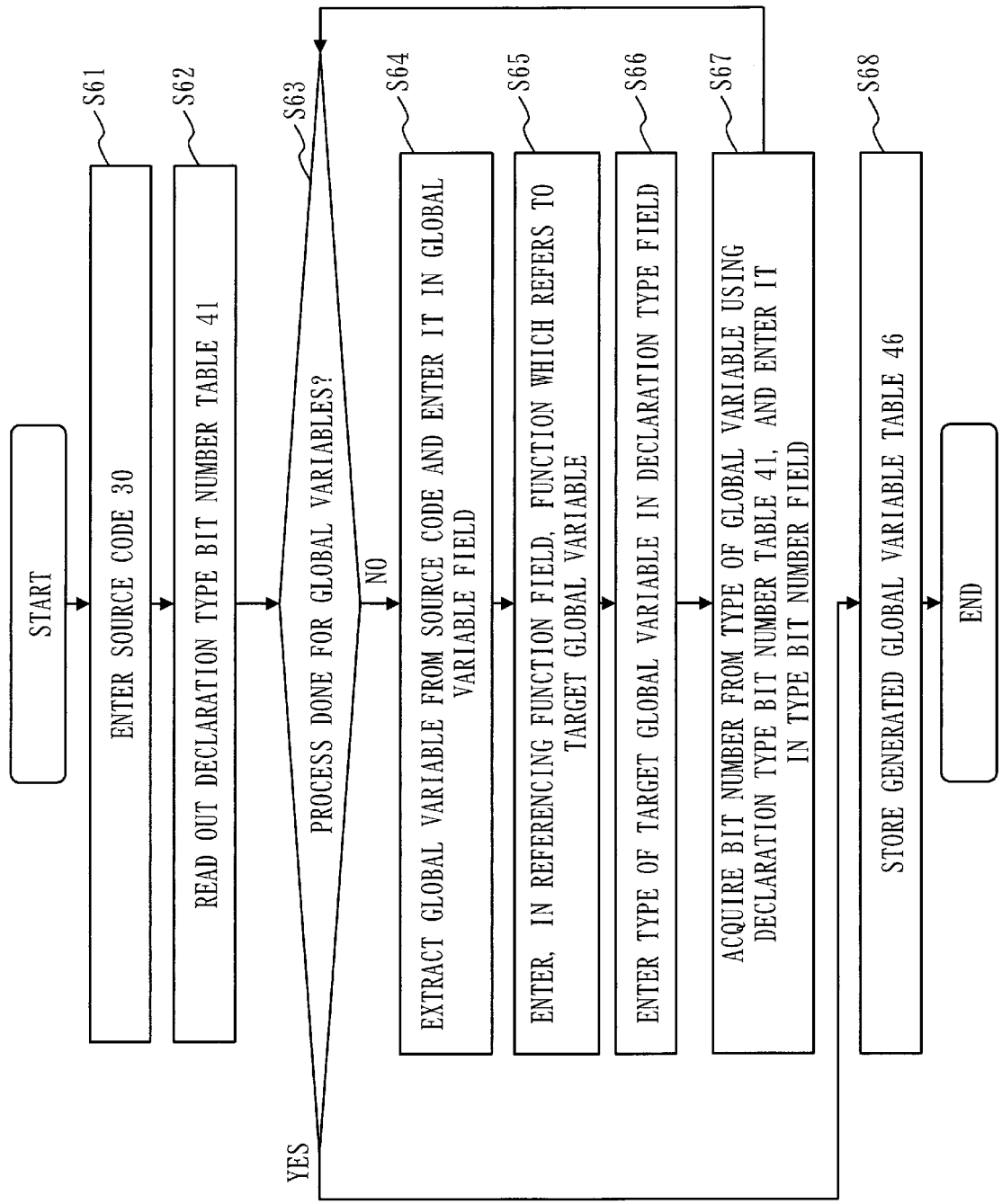
FIG. 13 is a flowchart of a global variable identifying process according to Embodiment 2.
Figure 14:
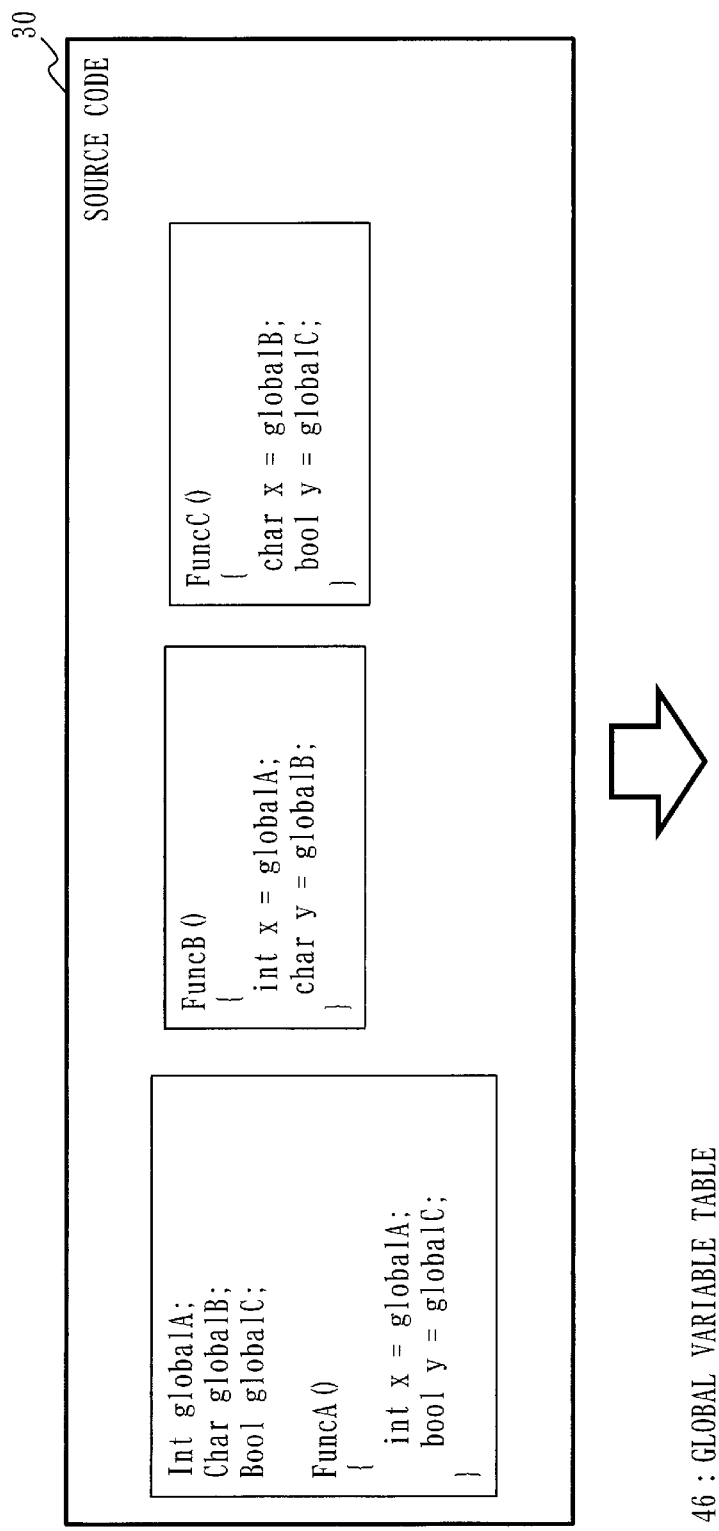
FIG. 14 is an explanatory diagram of the global variable identifying process according to Embodiment 2.

A global variable identifying process according to Embodiment 2 will be described with referring to FIGS. 13 and 14.

In step S61, the global variable identifying unit 24 accepts as input the analysis-target source code 30 via a communication interface 14. In step S62, a dependency identifying unit 21 reads out a declaration type bit number table 41 from a storage 13.

In step S63, a global variable identifying unit 24 determines whether or not the process is done for all the global variables included in the source code 30 accepted in step S61. If there is a global variable for which the process is not done yet, the global variable identifying unit 24 advances the process to step S64. If the process is done for all the global variables, the global variable identifying unit 24 advances the process to step S68.

In step S64, the global variable identifying unit 24 extracts one global variable for which the process is not done yet, from the source code 30, and takes it as a target global variable. The global variable identifying unit 24 enters, in a global variable field of a global variable table 46, the target global variable. In step S65, the global variable identifying unit 24 identifies a function 31 that refers to the target global variable, and enters it in a referencing function field of the global variable table 46. In step S66, the global variable identifying unit 24 enters, in a declaration type field of the global variable table 46, a type of the target global variable. In step S67, the global variable identifying unit 24 looks up the declaration type bit number table 41 to identify a bit number used by the type of the target global variable, and enters, in a type bit number field of the global variable table 46, the identified bit number.

In step S68, the global variable identifying unit 24 stores, in the storage 13, the global variable table 46 generated by processing from step S64 to step S67.

(Step S52 of FIG. 12: Influence Identifying Process)

An influence identifying unit 22 identifies an analysis influence degree between two target functions 31 from an information amount of a global variable the two target functions 31 commonly refer to.

Figure 15:
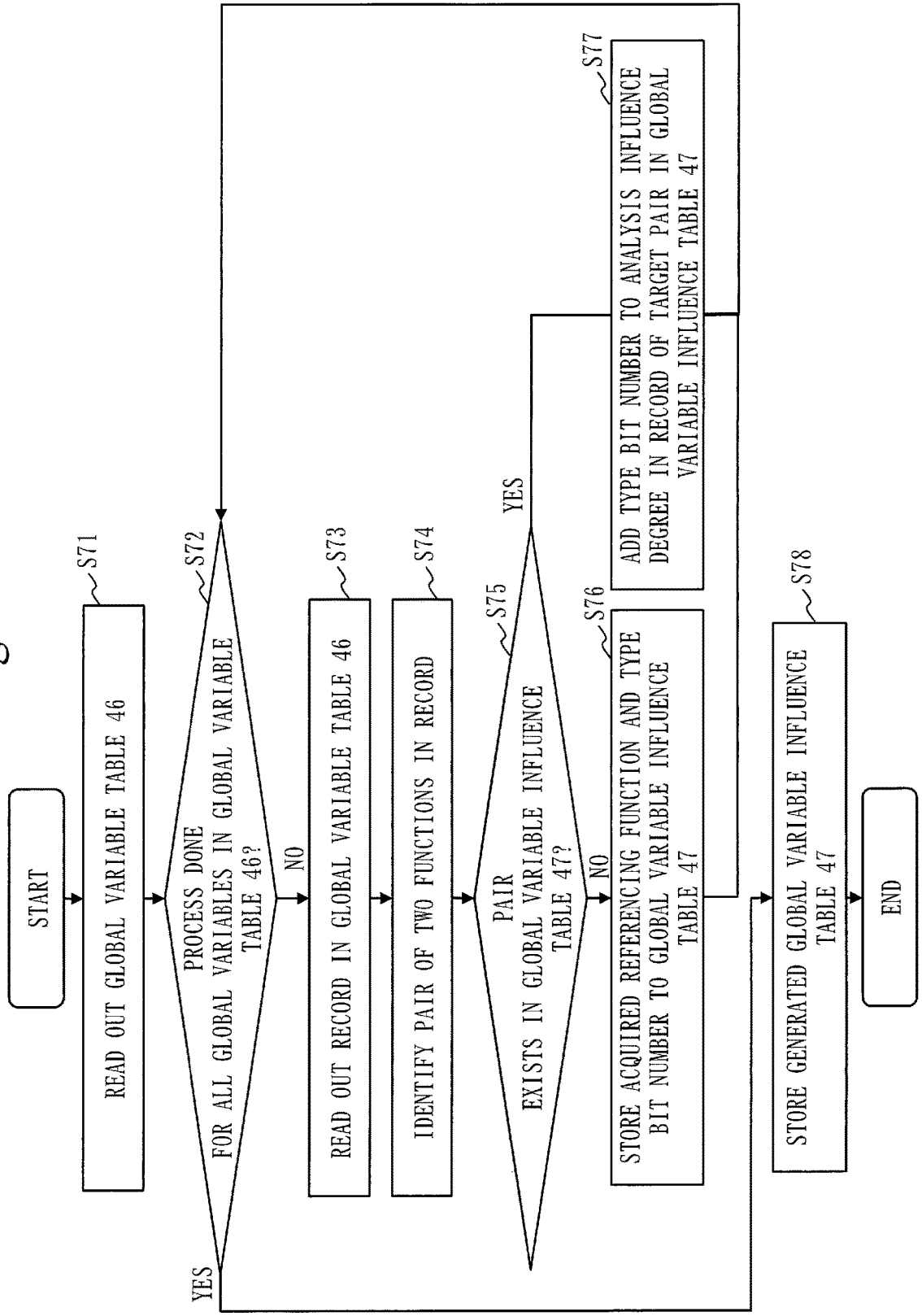
FIG. 15 is a flowchart of an influence identifying process according to Embodiment 2.
Figure 16:
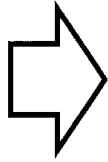
FIG. 16 is an explanatory diagram of the influence identifying process according to Embodiment 2.

An influence identifying process according to Embodiment 2 will be described with referring to FIGS. 15 and 16.

In step S71, the influence identifying unit 22 reads out the global variable table 46 generated in step S51 from the storage 13.

In step S72, the influence identifying unit 22 determines whether or not the process is done for all the global variables included in the global variable table 46. If there is a global variable for which the process is not done yet, the influence identifying unit 22 advances the process to step S73. If the process is done for all the global variables, the influence identifying unit 22 advances the process to step S78.

In step S73, the influence identifying unit 22 reads out a record on the global variable for which the process is not done yet, from the global variable table 46. In step S74, the influence identifying unit 22 identifies a pair of two functions registered as referencing functions in the record read out in step S73. If two or more functions are registered as the referencing functions, the influence identifying unit 22 identifies each pair consisting of two functions.

The influence identifying unit 22, for each pair identified in step S74 as a target, executes processing from step S75 to step S77.

In step S75, the influence identifying unit 22 determines whether or not the target pair exists in a global variable influence table 47. If the pair of the depending source and the depending destination does not exist in the global variable influence table 47, the influence identifying unit 22 advances the process to step S76. If the pair of the depending source and the depending destination exists in the global variable influence table 47, the influence identifying unit 22 advances the process to step S77.

In step S76, the influence identifying unit 22 enters functions 31 of the target pair, in corresponding referencing function fields of the global variable influence table 47. The influence identifying unit 22 also enters, in an analysis influence degree of the global variable influence table 47, the type bit number in the record read out in step S73.

In step S77, the influence identifying unit 22 identifies a record about the target pair in the global variable influence table 47. The influence identifying unit 22 adds the type bit number in the record read out in step S73 to the analysis influence degree in the record of the identified global variable influence table 47.

FuncA and FuncB commonly refer to globalA, which is an int-type global variable. Hence, information is passed between FuncA and FuncB via globalA. Therefore, the analysis influence degree of the pair of FuncA and FuncB is 16, which is an int-type bit number. That is, if FuncA and FuncB are split into separate split codes 32, an information amount corresponding to 16 bits is lost, and the analysis accuracy decreases accordingly.

In step S78, the influence identifying unit 22 stores, in the storage 13, the global variable influence table 47 generated by processing from step S74 to step S77.

(Step S53 of FIG. 12: Splitting Process)

The splitting unit 23 splits the source code 30 into a plurality of split codes 32 based on the analysis influence degrees identified in step S52. That is, the splitting unit 23 splits the source code 30 into the plurality of split codes 32 based on the analysis influence degrees in the global variable influence table 47. Splitting is performed in the same manner as in the process of step S13 of FIG. 2.

*Effect of Embodiment 2*

As described above, the source code splitting device 10 according to Embodiment 2 identifies the information amount passed between the two functions 31 from the information amount of the global variable the two functions 31 commonly refer to. The source code splitting device 10 identifies the analysis influence degrees from the identified information amount and splits the source code 30 into the plurality of split codes 32 based on the identified analysis influence degrees. Hence, it is possible to reduce an extent of decrease in analysis accuracy caused by splitting the source code 30.

*Other Configurations*

<Modification 4>

In Embodiment 2, the analysis influence degree between the two target functions 31 is identified from the information amount of the global variable the two functions 31 commonly refer to. In Modification 4, the analysis influence degree may be identified considering not only the information amount of the global variable the two functions 31 commonly refer to, but also the information amount passed between the two target functions 31, which is described in Embodiment 1. Therefore, the analysis influence degrees can be identified more appropriately. As a result, the source code 30 can be split more appropriately.

Figure 17:
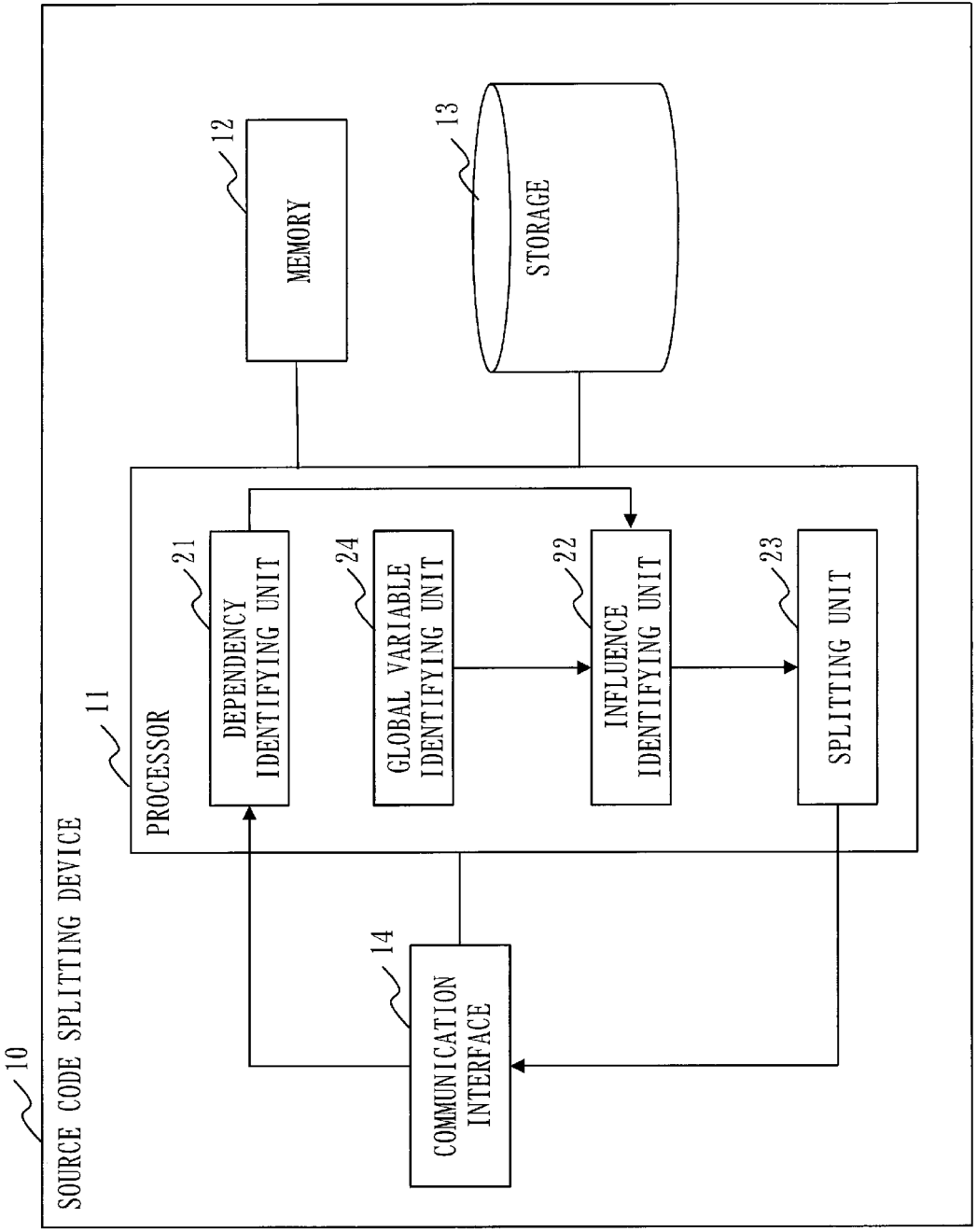
FIG. 17 is a configuration diagram of a source code splitting device 10 according to Modification 4.

A configuration of a source code splitting device 10 according to Modification 4 will be described with referring to FIG. 17.

Figure 11:
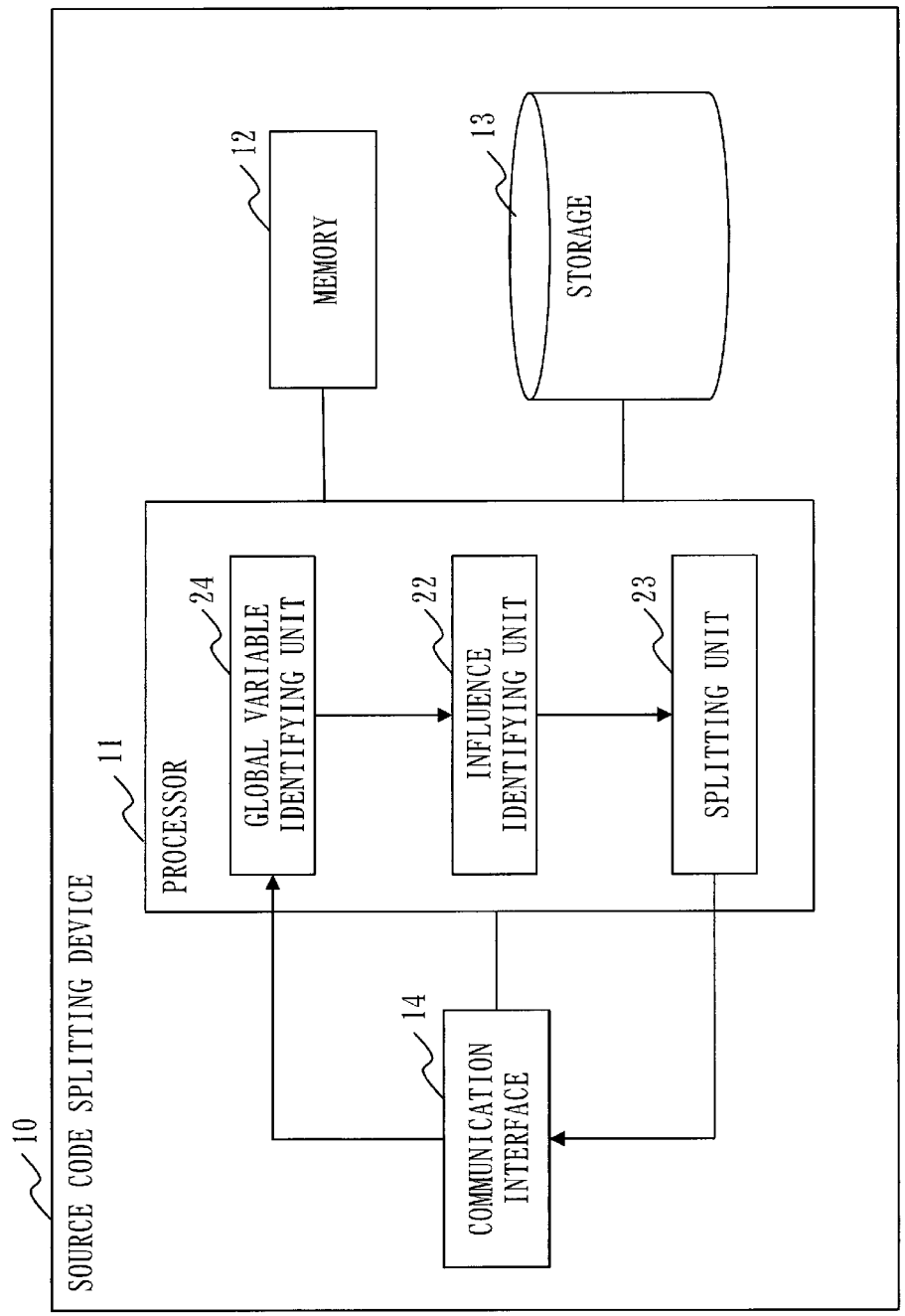
FIG. 11 is a configuration diagram of a source code splitting device 10 according to Embodiment 2.

The source code splitting device 10 is provided with both of a dependency identifying unit 21 whose counterpart is illustrated in FIG. 1 and a global variable identifying unit 24 whose counterpart is illustrated in FIG. 11.

Behavior of the source code splitting device 10 according to Modification 4 will be described with referring to FIG. 18.

Processing from step S81 to step S82 is the same as processing from step S11 to step S12 of FIG. 2. Processing from step S83 to step S84 is the same as processing from step S51 to step S52 of FIG. 12.

Figure 18:
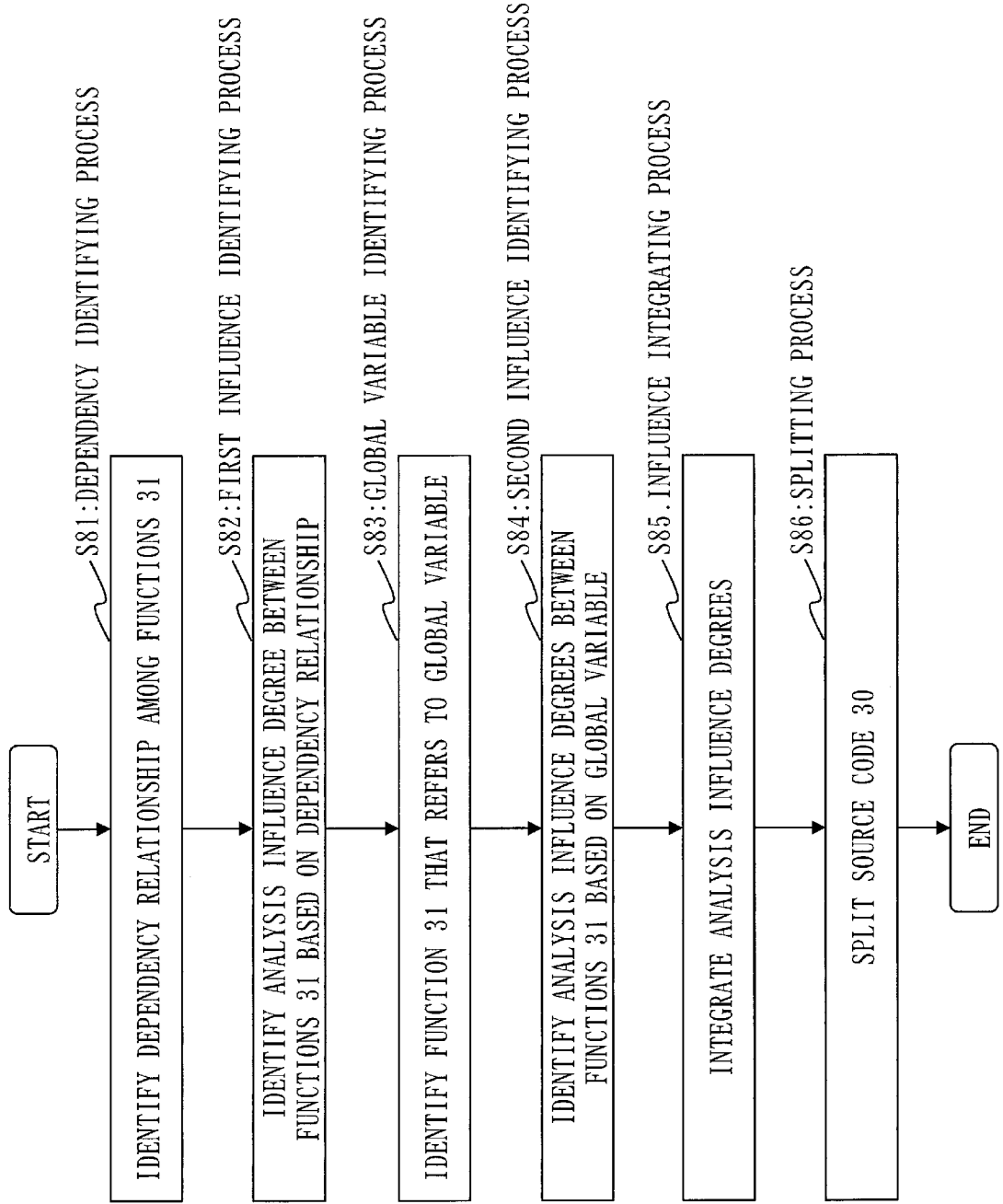
FIG. 18 is a flowchart illustrating overall behavior of the source code splitting device 10 according to Modification 4.

(Step S85 of FIG. 18: Influence Integrating Process)

An influence identifying unit 22 integrates analysis influence degrees identified in step S82 with analysis influence degrees identified in step S84.

Figure 19:
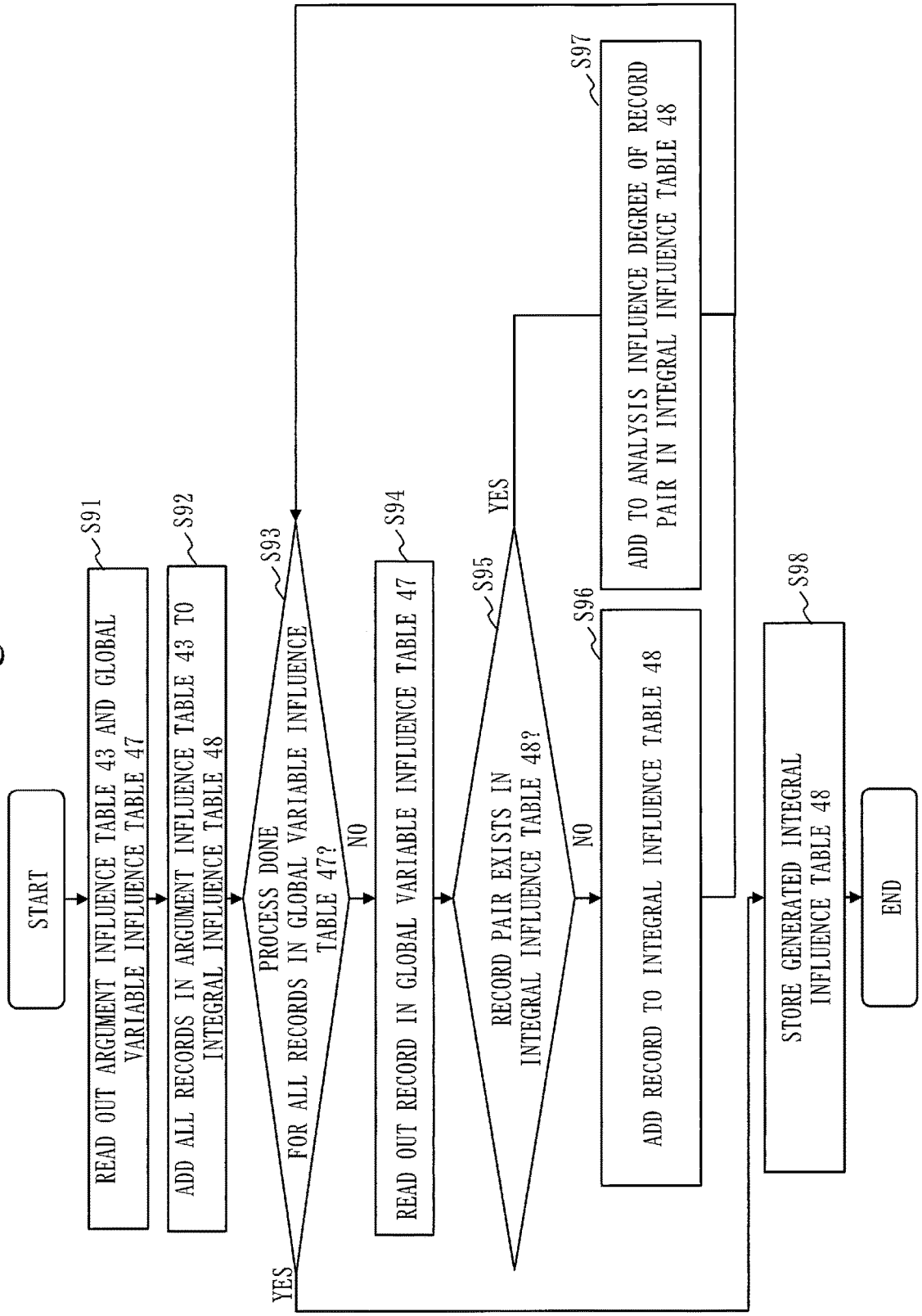
FIG. 19 is a flowchart of an influence integrating process according to Modification 4.

An influence integrating process according to Modification 4 will be described with referring to FIGS. 19 and 20.

In step S91, the influence identifying unit 22 reads out, from a storage 13, an argument influence table 43 generated by a process of step S82 and a global variable influence table 47 generated by a process of step S84.

In step S92, the influence identifying unit 22 adds all the records in the argument influence table 43 to an integral influence table 48.

In step S93, the influence identifying unit 22 determines whether or not the process is done for all the records included in the global variable influence table 47. If there is a record for which the process is not done yet, the influence identifying unit 22 advances the process to step S94. If the process is done for all the records, the influence identifying unit 22 advances the process to step S98.

In step S94, the influence identifying unit 22 reads out one record for which the process is not done yet, from the global variable influence table 47. In step S95, the influence identifying unit 22 determines whether or not a pair of referencing functions in the record read out in step S94 exists in the integral influence table 48. If the pair of the referencing functions does not exist in the integral influence table 48, the influence identifying unit 22 advances the process to step S96. If the pair of the referencing functions exists in the integral influence table 48, the influence identifying unit 22 advances the process to step S97.

In step S96, the influence identifying unit 22 adds the record read out in step S94 to the integral influence table 48.

In step S97, the influence identifying unit 22 identifies, in the integral influence table 48, a record corresponding to the pair of the referencing functions in the record read out in step S94. The influence identifying unit 22 adds the analysis influence degrees in the record read out in step S94 to analysis influence degrees in the identified record in the integral influence table 48.

In step S98, the influence identifying unit 22 stores, in the storage 13, the integral influence table 48 generated by processing from step S95 to step S97.

(Step S86 of FIG. 18: Splitting Process)

A splitting unit 23 splits a source code 30 into a plurality of split codes 32 based on the analysis influence degrees identified in step S85. That is, the splitting unit 23 splits the source code 30 into the plurality of split codes 32 based on the analysis influence degrees in the integral influence table 48. Splitting is performed in the same manner as in the process of step S13 of FIG. 2.

Embodiment 3

Analysis influence degrees are identified with considering hierarchical dependency relationships. This is where Embodiment 3 is different from Embodiments 1 and 2. In Embodiment 3, this difference will be described, and a description on the same points will be omitted.

Embodiment 3 describes a case where a feature is added to Embodiment 1. Alternatively, it is possible to add a feature to Embodiment 2 or Modification 4.

Figure 21:
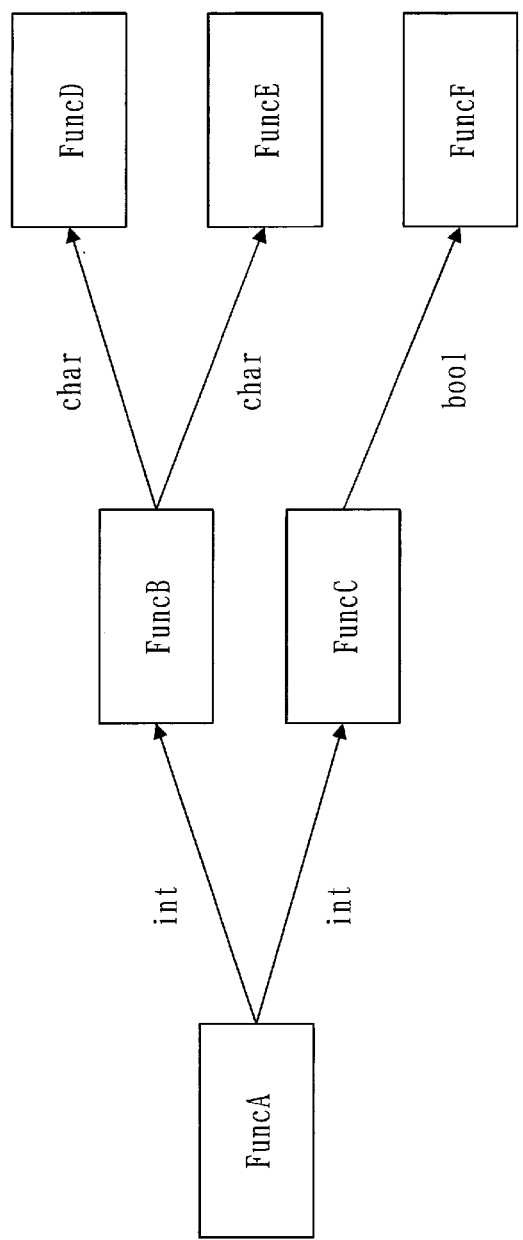
FIG. 21 is an explanatory diagram of a case according to Embodiment 3 where dependency relationships among functions 31 are hierarchical.

As illustrated in FIG. 21, there is a case where dependency relationships among functions 31 are hierarchical. For example, in FIG. 21, between FuncA and FuncB, FuncA is a depending source and FuncB is a depending destination. Between FuncB and FuncD, FuncB is a depending source and FuncD is a depending destination. That is, FuncB being the depending destination of FuncA is a depending source of FuncD.

In this case, if FuncA and FuncB are split into separate split codes 32, not only FuncB but also FuncD will be influenced. Hence, an influence identifying unit 22 identifies analysis influence degrees between two functions considering the hierarchical dependency relationships.

*Description of Behavior*

Behavior of a source code splitting device 10 according to Embodiment 3 will be described with referring to FIGS. 22 and 23.

Processing from step S101 to step S102 is the same as processing from step S11 to step S12 of FIG. 2.

Figure 22:
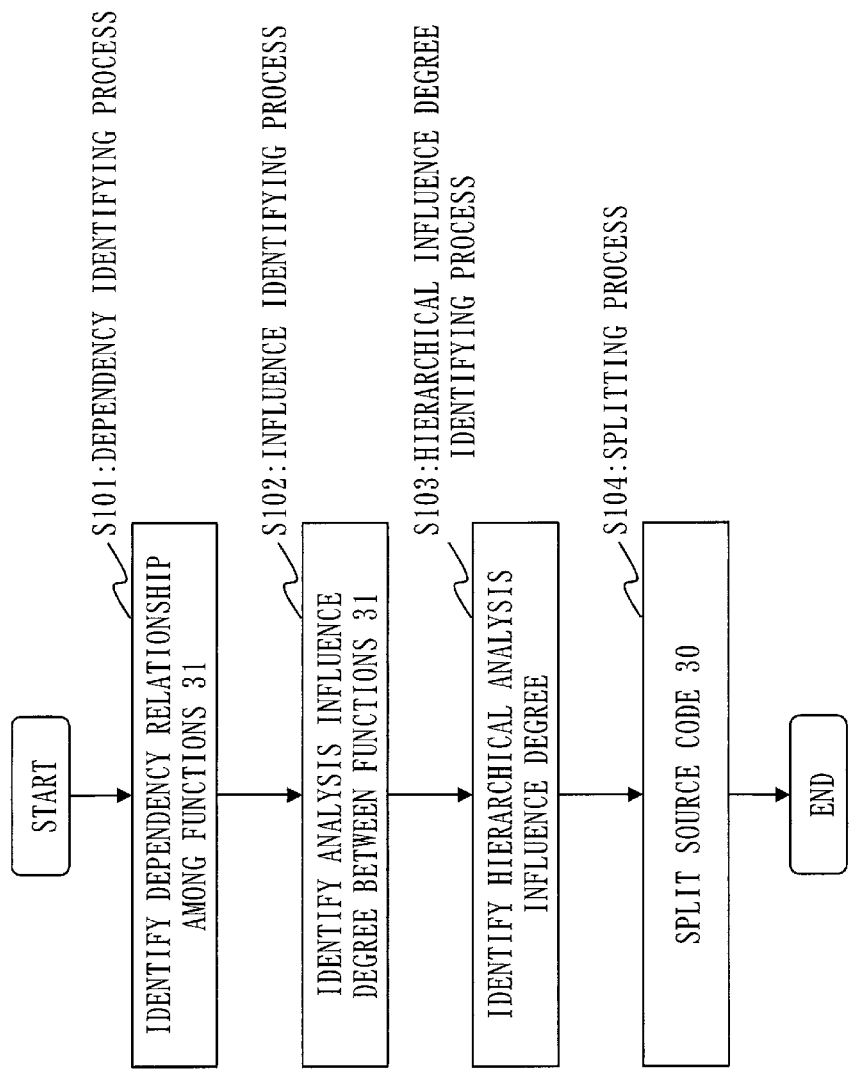
FIG. 22 is a flowchart illustrating overall behavior of a source code splitting device 10 according to Embodiment 3.

(Step S103 of FIG. 22: Hierarchical Influence Degree Identifying Process)

The influence identifying unit 22 identifies analysis influence degrees between two target functions 31 based on analysis influence degrees between a called function 31 out of the two target functions 31, and another function 31.

Specifically, the influence identifying unit 22 identifies a hierarchical influence degree, which is a sum of analysis influence degrees of individual lower-order functions 31 sequentially totaled starting from a lower-order function 31 in the hierarchy. In the example of FIG. 21, first, the influence identifying unit 22 identifies a hierarchical influence degree between FuncB and FuncD, between FuncB and FuncE, and between FuncC and FuncF. Then, the influence identifying unit 22 identifies a hierarchical influence degree between FuncA and FuncB, and between FuncA and FuncC.

Hence, the hierarchical influence degrees between the functions 31 are identified as illustrated in FIG. 23. That is, the hierarchical influence degree is 0 between FuncB and FuncD, between FuncB and FuncE, and between FuncC and FuncF, because a lower-order function 31 does not exist.

Between FuncA and FuncB, the hierarchical influence degree is 16, which is a sum of an analysis influence degree between FuncB and FuncD, a hierarchical influence degree between FuncB and FuncD, an analysis influence degree between FuncB and FuncE, and a hierarchical influence degree between FuncB and FuncE. Between FuncA and FuncC, the hierarchical influence degree is 1, which is a sum of an analysis influence degree between FuncC and FuncF and a hierarchical influence degree between FuncC and FuncF.

Then, the influence identifying unit 22 totals the analysis influence degrees between the individual functions 31 and the hierarchical influence degrees between the individual functions 31, and takes the sum as a new analysis influence degree.

Alternatively, a new analysis influence degree may be derived from multiplying the hierarchical influence degree by a coefficient of less than 1 and totaling the analysis influence degree and the resultant hierarchical influence degree.

In the example of FIG. 21, if the method described in Embodiment 1 is employed, the analysis influence degree between FuncA and FuncB is 16 and the analysis influence degree between FuncA and FuncC is 16, which are equal with each other. However, when the hierarchical dependency relationships are taken into consideration, the analysis influence degree between FuncA and FuncB is 32 and the analysis influence degree between FuncA and FuncC is 17.

(Step S104 of FIG. 22: Splitting Process)

The splitting unit 23 splits the source code 30 into the plurality of split codes 32 based on the new analysis influence degrees identified in step S103. Splitting is performed in the same manner as in the process of step S13 of FIG. 2.

*Effect of Embodiment 3*

As described above, the source code splitting device 10 according to Embodiment 3 identifies the analysis influence degrees considering the hierarchical dependency relationships. Therefore, the analysis influence degrees can be identified more appropriately. As a result, the source code 30 can be split more appropriately.

Embodiment 4

An analysis influence degree is identified with considering a usage status of an argument in processing of a function 31 being an argument passing destination. This is where Embodiment 4 is different from Embodiment 1. In Embodiment 4, this difference will be described, and a description on the same points will be omitted.

In the function 31 being an argument passing destination, various processes are performed with utilizing an argument. There may be a case where an argument is referred to only once; a case where an argument is referred to a plurality of times; a case where an argument is merely assigned; and a case where an argument is utilized as a branching condition of the processes. Due to these differences in usage status of the argument, the analysis influence degree differs even if an argument having the same information amount is passed. Hence, an influence identifying unit 22 identifies the analysis influence degree considering a usage status of an argument in the function 31 being an argument passing destination.

*Description of Behavior*

Behavior of a source code splitting device 10 according to Embodiment 4 will be described with referring to FIGS. 24 and 25.

Processing from step S111 to step S112 is the same as processing from step S11 to step S12 of FIG. 2.

Figure 24:
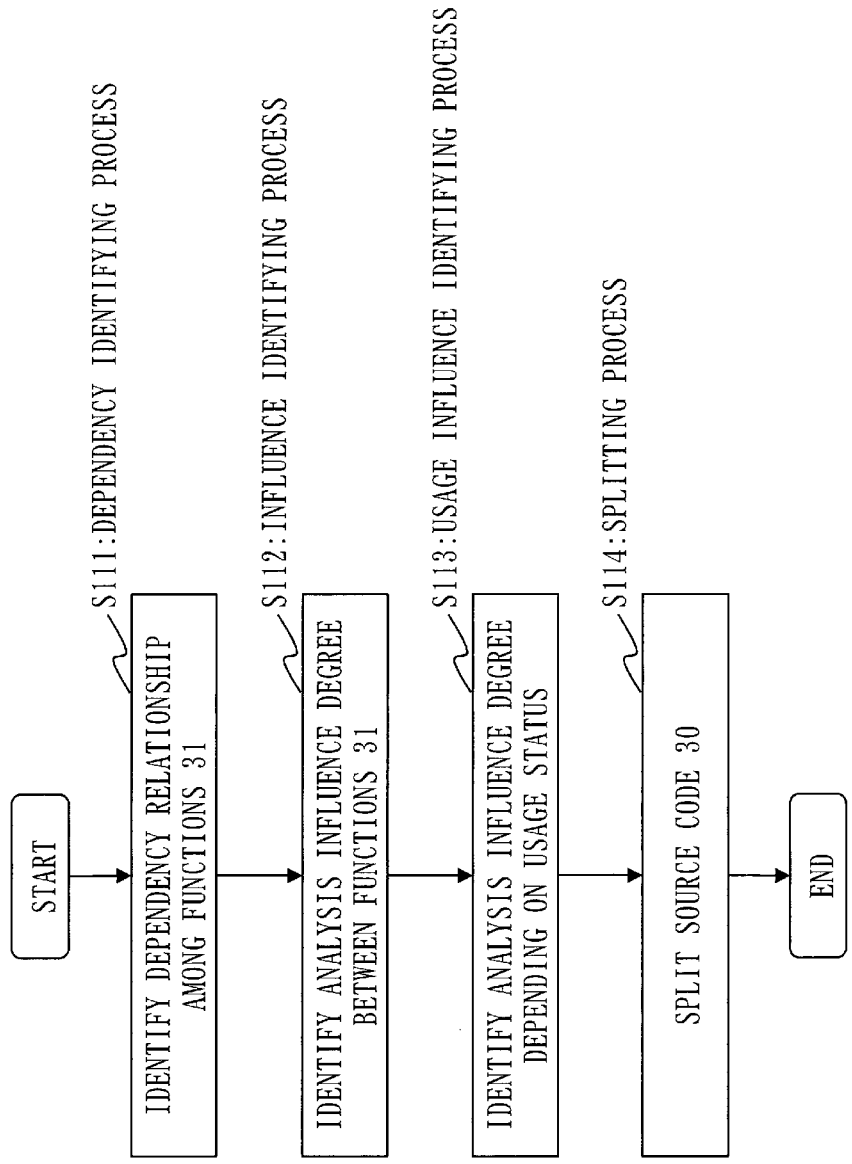
FIG. 24 is a flowchart illustrating overall behavior of a source code splitting device 10 according to Embodiment 4.
Figure 25:
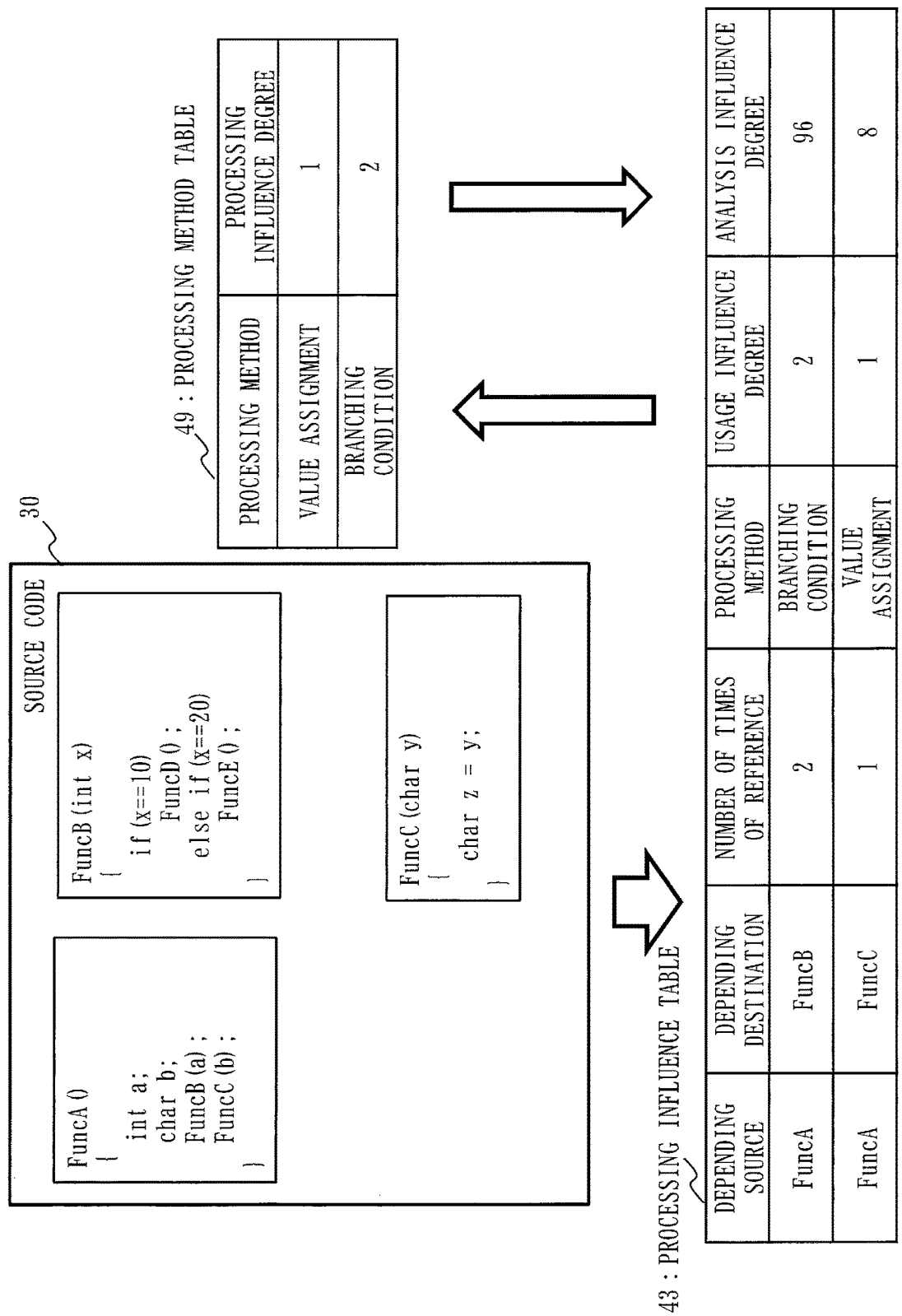
FIG. 25 is an explanatory diagram of a usage influence degree identifying process according to Embodiment 4.

(Step S113 of FIG. 24: Usage Influence Identifying Process)

The influence identifying unit 22 identifies analysis influence degrees between two target functions 31 based on at least either one of a number of times of reference information passed between two target functions 31 is referred to, and a processing content that uses the information passed between the two target functions 31.

Specifically, when identifying each analysis influence degree considering the number of times of reference, the influence identifying unit 22 identifies a number of times of reference of an argument in a function 31 being a passing destination of the argument. The influence identifying unit 22 then multiplies the analysis influence degree identified in step S112 by the number of times of reference, and takes the result as a new analysis influence degree.

When identifying each analysis influence degree considering the processing content, the influence identifying unit 22 identifies a processing content that uses an argument in the function 31 being the passing destination of the argument. The influence identifying unit 22 then multiplies the analysis influence degree identified in step S112 by a coefficient determined in advance for each processing content, and takes the result as a new analysis influence degree. FIG. 25 employs a processing method table 49 in which coefficient 1 is defined for value assignment and coefficient 2 is defined for branching condition.

When identifying each analysis influence degree considering both the number of times of reference and the processing content, the influence identifying unit 22 multiplies the analysis influence degree identified in step S112 by the number of times of reference and by the coefficient determined in advance for each processing content, and takes the result as a new analysis influence degree.

\*\*\*Effect of Embodiment 4\*\*\*

As described above, the source code splitting device 10 according to Embodiment 4 identifies the analysis influence degree considering a usage status of an argument in processing of the function 31 being a passing destination of the argument. Therefore, the analysis influence degree can be identified more appropriately. As a result, a source code 30 can be split more appropriately.

Embodiment 5

In Embodiment 5, a description will be made on a source code analyzing device 50 that analyzes a plurality of split codes 32 generated by the source code splitting device 10 described in any one of Embodiments 1 to 4.

\*\*\*Description of Configuration\*\*\*

A configuration of the source code analyzing device 50 according to Embodiment 5 will be described with referring to FIG. 26.

The source code analyzing device 50 is a computer.

The source code analyzing device 50 is provided with hardware devices, which are a processor 51, a memory 52, a storage 53, and a communication interface 54. The processor 51 is connected to the other hardware devices via a signal line and controls these other hardware devices.

The processor 51 is an IC which performs processing. Specific examples of the processor 51 are a CPU, a DSP, and a GPU.

The memory 52 is a storage device which stores data temporarily. Specific examples of the memory 52 are an SRAM and a DRAM.

The storage 53 is a storage device which stores data. A specific example of the storage 53 is an HDD. Alternatively, the storage 53 may be a portable recording medium such as an SD (registered trademark) memory card, a CF (registered trademark), a NAND flash, a flexible disk, an optical disk, a compact disk, a blu-ray (registered trademark) disk, and a DVD.

The communication interface 54 is an interface to communicate with an external device. Specific examples of the communication interface 54 are an Ethernet (registered trademark) port, a USB port, and an HDMI (registered trademark) port.

The source code analyzing device 50 is provided with a reference identifying unit 61, a structure identifying unit 62, an information acquiring unit 63, an analyzing unit 64, and an information storing unit 65, as feature constituent elements. Features of the feature constituent elements of the source code analyzing device 50 are implemented by software.

A program that implements the features of the feature constituent elements of the source code analyzing device 50 is stored in the storage 53. This program is read into the memory 52 by the processor 51 and executed by the processor 51. Hence, the features of the feature constituent elements of the source code analyzing device 50 are implemented.

A referential relationship table 531 and an analysis information table 532 are also stored in the storage 53.

Figure 26:
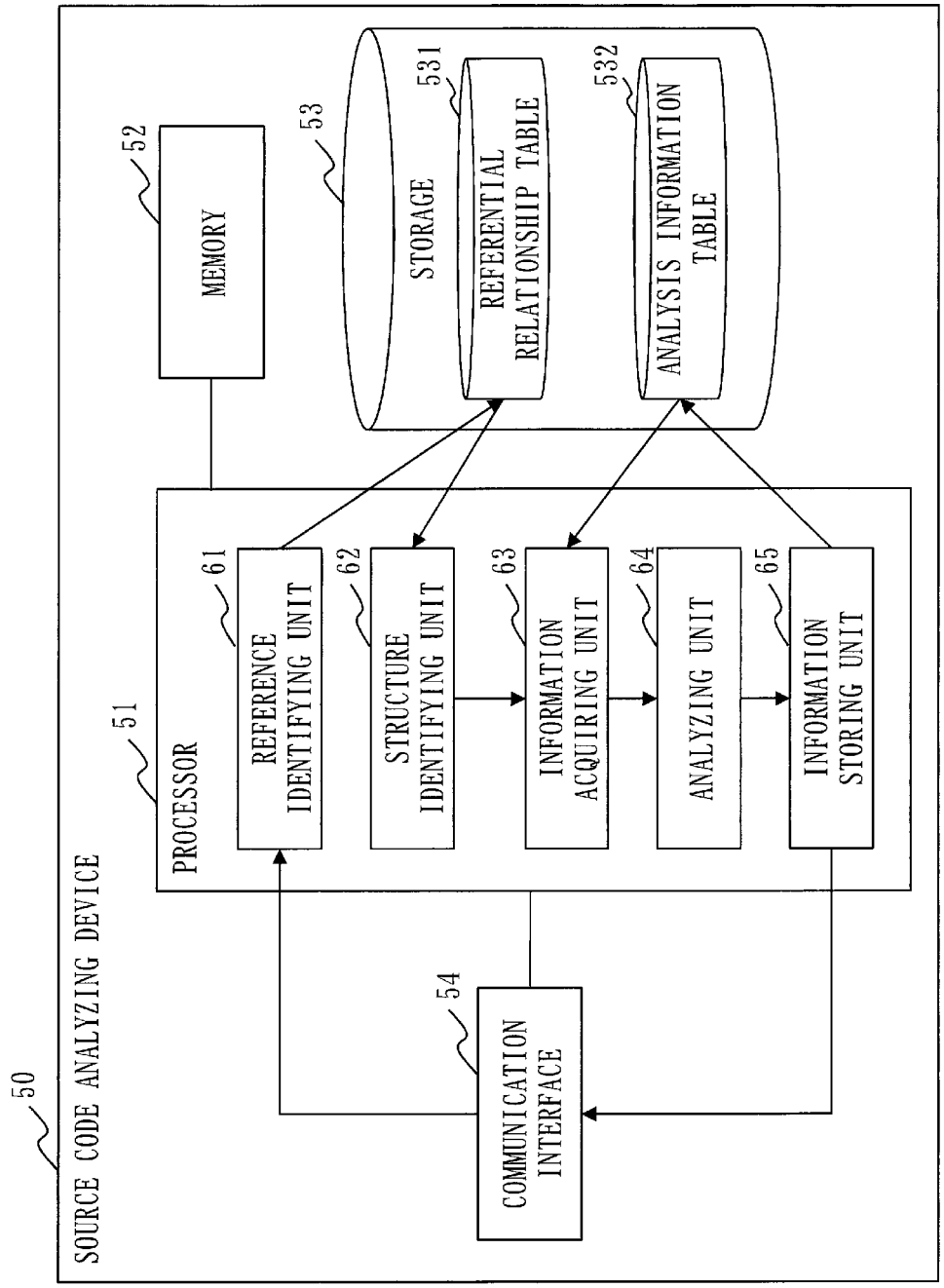
FIG. 26 is a configuration diagram of a source code analyzing device 50 according to Embodiment 5.

FIG. 26 illustrates only one processor 51. However, there may be a plurality of processors 51. The plurality of processors 51 may cooperate to execute the program that implements the features.

A configuration of the referential relationship table 531 according to Embodiment 5 will be described with referring to FIG. 27.

The referential relationship table 531 is a table having, as "key", a name to which a function name or a global variable name is set and, as "value", a referencing function and a referenced function.

A configuration of the analysis information table 532 according to Embodiment 5 will be described with referring to FIG. 28.

The analysis information table 532 is a table having, as "key", a name to which a function name or a global variable name is set and, as "value" a value range of an argument, a value range of a return value range or global variable, and an analysis result. The value range of the argument includes an argument name, a minimum value "min", and a maximum value "MAX". The value range of the return value or global variable includes a minimum value "min" and a maximum value "MAX". The analysis result includes a line number and a result.

Results involved in the analysis result are "secure", "risky", and "unproved". "Secure" signifies that for any value, processing of a relevant line causes no inconveniences. "Risky" signifies that for any value, processing of a relevant line causes inconveniences. "Unproved" signifies that depending on the value, processing of a relevant line causes inconveniences.

When a source code 30 is split, information on a function that refers and information on a function that is referred to may lack. In this case, a value range of the argument of the function and a value range of the return value of the function become unknown. When a value range is unknown, analysis is carried out using a value ranging from a minimum value to a maximum value each identified by the type. Consequently, unproved lines in the result involved in the analysis result increase. The increase in unproved lines will be called a decrease in analysis accuracy.

A system provided with the source code splitting device 10 described in one of Embodiments 1 to 4 and the source code analyzing device 50 will be called a source code analyzing device. The source code splitting device 10 described in one of Embodiments 1 to 4 and the source code analyzing device 50 may be implement by one computer. That is, the source code analyzing system may be implemented by one computer.

\*\*\*Description of Behavior\*\*\*

Behavior of the source code analyzing device 50 according to Embodiment 5 will be described with referring to FIGS. 29 to 38.

The behavior of the source code analyzing device 50 according to Embodiment 5 corresponds to a source code analyzing method according to Embodiment 5. The behavior of the source code analyzing device 50 according to Embodiment 5 also corresponds to a source code analyzing program according to Embodiment 5.

In following description, it is assumed that the source code 30 is split into a split code 32A and a split code 32B by the source code splitting device 10, as illustrated in FIG. 29, and that analysis on the split code 32B is done.

A pre-process of the source code analyzing device 50 according to Embodiment 5 will be described.

The pre-process is a process executed prior to overall behavior of the source code analyzing device 50 to be described below.

In the pre-process, the reference identifying unit 61 identifies a referencing function and a referenced function for each function and each global variable defined by the source code 30. The reference identifying unit 61 enters, in the referential relationship table 531, the identified referencing function and referenced function.

Figure 30:
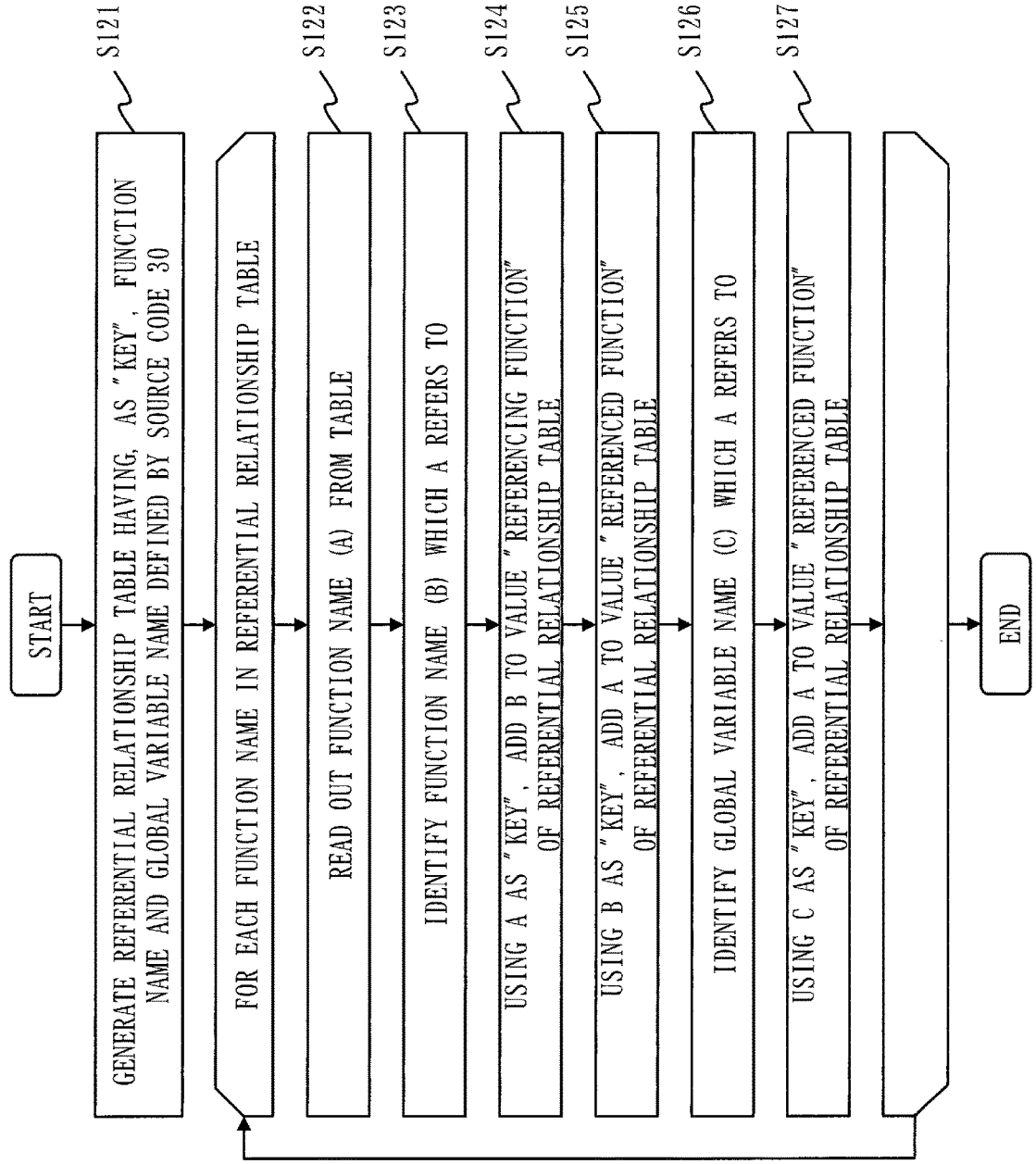
FIG. 30 is a flowchart of a reference identifying process according to Embodiment 5.

A reference identifying process according to Embodiment 5 will be described with referring to FIGS. 30 and 31.

In step S121, the reference identifying unit 61 accepts as input an analysis-target source code 30 via the communication interface 54. The reference identifying unit 61 extracts all the function names and all the global variable names defined by the source code 30. The reference identifying unit 61 enters, in name fields of the referential relationship table 531, the extracted function names and global variable names.

The reference identifying unit 61 executes processing from step S122 to step S127 for each function name being set in the name field of the referential relationship table 531, as a target.

In step S122, the reference identifying unit 61 reads out the target function name from the referential relationship table 531. The readout function name will be function name A.

In step S123, the reference identifying unit 61 identifies in the source code 30 a function that a function expressed by function name A refers to. A function name of the identified function will be function name B. In step S124, the reference identifying unit 61 enters, in the referencing function of "value" of a record having function name A as "key", function name B. In step S125, the reference identifying unit 61 enters, in the referenced function of "value" of a record having function name B as "key", function name A.

In step S126, the reference identifying unit 61 identifies in the source code 30 a global variable name that a function expressed by function name A refers to. The identified global variable name will be variable name C. In step S127, the reference identifying unit 61 enters, in the referenced function of "value" of a record having variable name C as "key", function name A.

When the reference identifying process is executed for the source code 30 illustrated in FIG. 29 as input, the referential relationship table 531 is generated as illustrated in FIG. 31. The referential relationship table 531 illustrated in FIG. 31 has, as "key", funcA, funcB, funcC, and funcD each being a function defined by the source code 30 and g_valA being a global variable defined by the source code 30. Referencing functions and referenced functions of these functions and global variable are identified and taken as "value".

The overall behavior of the source code analyzing device 50 according to Embodiment 5 will be described with referring to FIG. 32.

Figure 32:
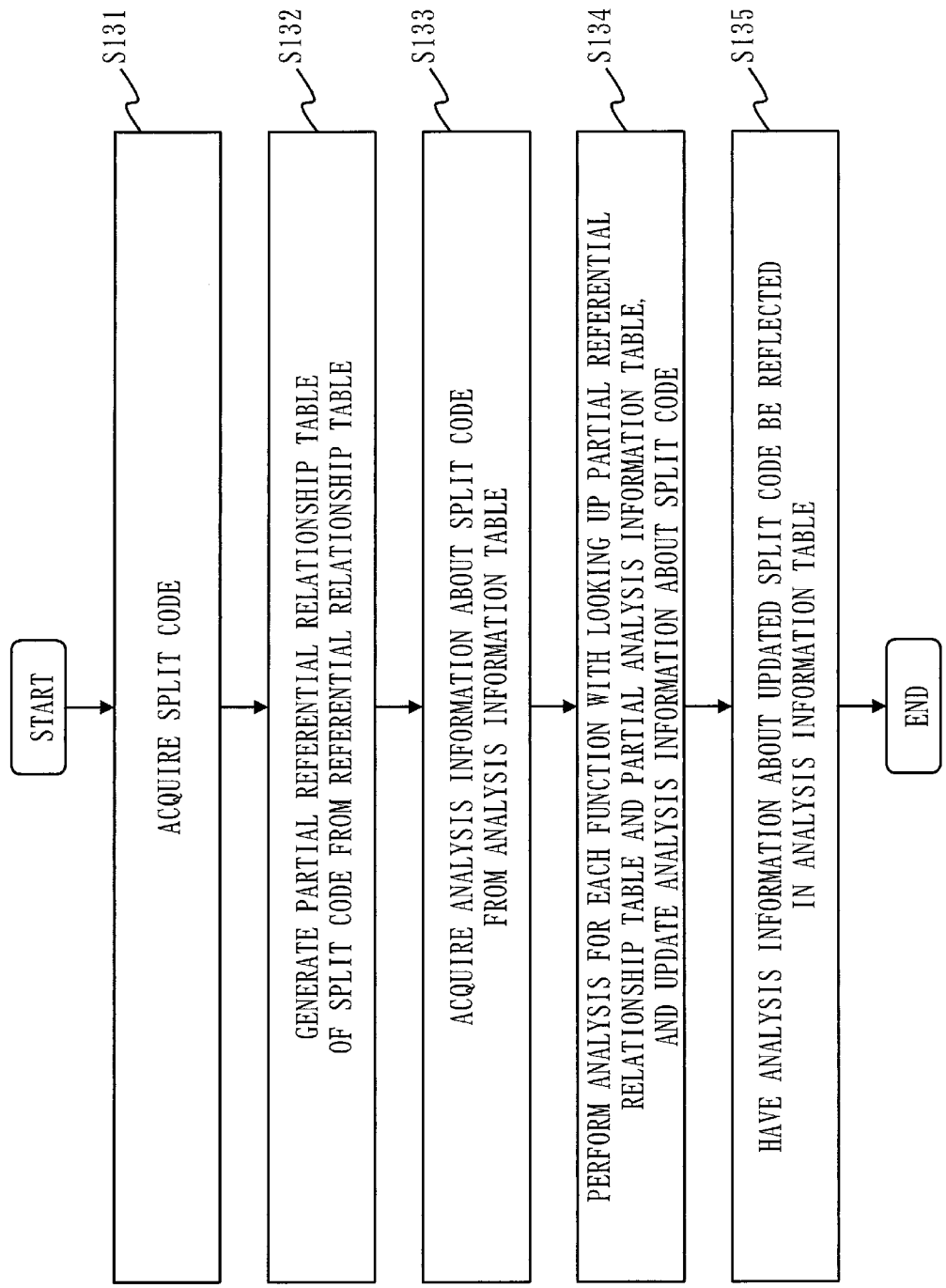
FIG. 32 is a flowchart illustrating overall behavior of the source code analyzing device 50 according to Embodiment 5.

(Step S131 of FIG. 32: Code Acquiring Process)

The structure identifying unit 62 acquires the split code 32 to be taken as an analysis processing target from among the plurality of split codes 32 generated by splitting the source code 30.

(Step S132 of FIG. 32: Structure Identifying Process)

The structure identifying unit 62 looks up the referential relationship table 531 to identify a referential relationship of the processing-target split code 32 acquired in step S131. The structure identifying unit 62 generates a partial referential relationship table 533 indicating the identified referential relationship and writes it in the memory 52. A configuration of the partial referential relationship table 533 is the same as the configuration of the referential relationship table 531.

Figure 33:
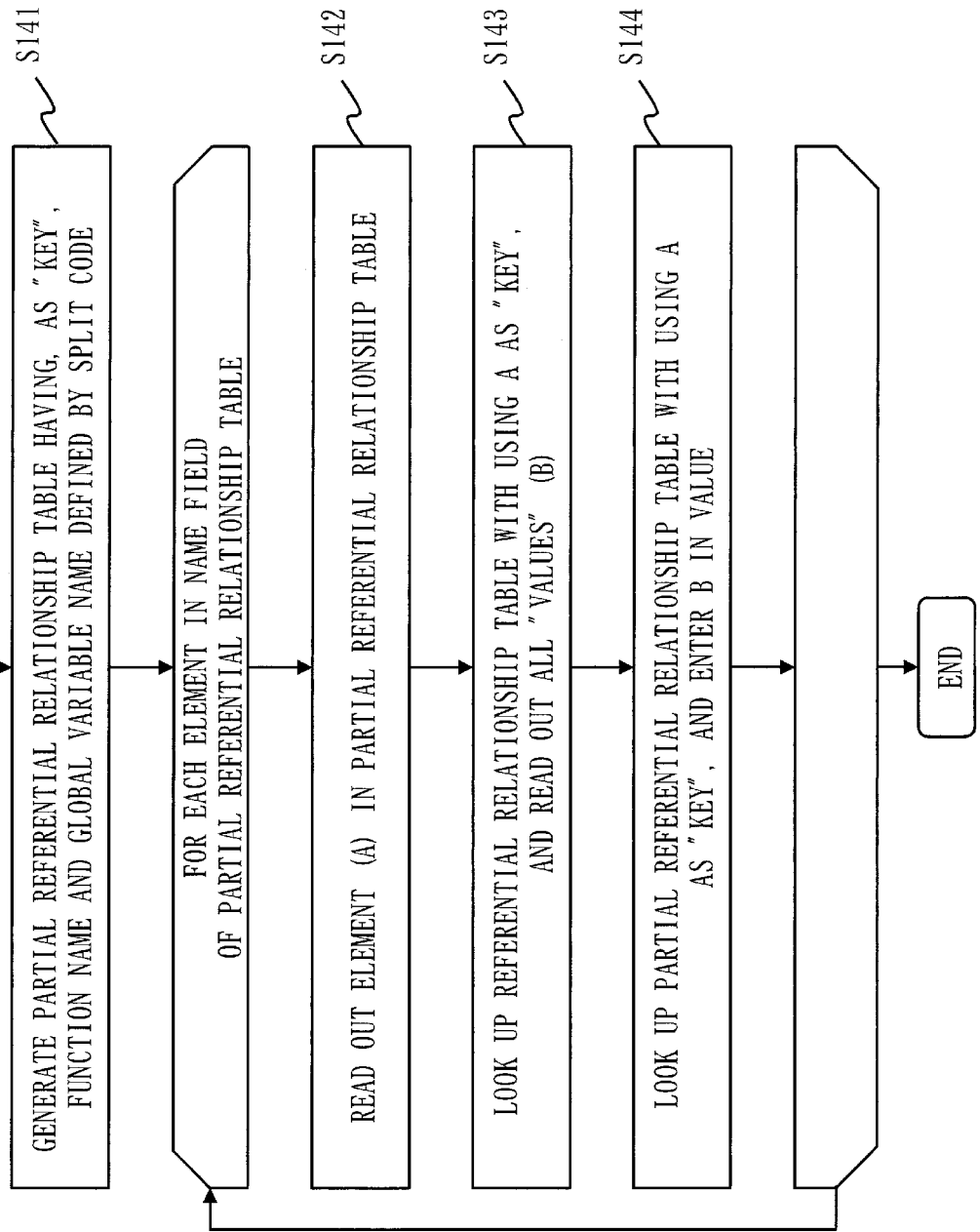
FIG. 33 is a flowchart of a structure identifying process according to Embodiment 5.

A structure identifying process according to Embodiment 5 will be described with referring to FIGS. 33 and 34.

In step S141, the structure identifying unit 62 extracts all the function names and global variable name which are defined by the processing-target split code 32. The structure identifying unit 62 enters, in the name fields of the partial referential relationship table 533, the extracted function names and global variable name.

The structure identifying unit 62 executes processing from step S142 to step S144 for each element (the function name, the global variable name) being set in the name field of the partial referential relationship table 533, as a target.

In step S142, the structure identifying unit 62 reads out a target element from the partial referential relationship table 533. The readout element will be referred to as element A. In step S143, the structure identifying unit 62 reads out, from the referential relationship table 531, all the values each having element A as "key". The readout value will be referred to as value B. In step S144, the structure identifying unit 62 enters value B in "value" of a record having, as "key", element A listed in the partial referential relationship table 533.

When the structure identifying process is executed for the split code 32A illustrated in FIG. 29 as input, the partial referential relationship table 533 is generated as illustrated in FIG. 34. The partial referential relationship table 533 illustrated in FIG. 34 has, as "key", funcA and funcB each being a function defined by the split code 32A and g_valA being a global variable. Also, referencing functions and referenced functions for these functions and global function are identified and taken as "value". Since the partial referential relationship table 533 is generated with looking up the referential relationship table 531, it is possible to include information on funcD that does not appear in the split code 32A, into the partial referential relationship table 533.

(Step S133 of FIG. 32: Information Acquiring Process)

The information acquiring unit 63 looks up the analysis information table 532 to acquire value range information indicating ranges of values that variables related to the processing-target split code 32 acquired in step S131 can take. The information acquiring unit 63 generates a partial analysis information table 534 indicating acquired analysis information and writes it in the memory 52. A configuration of the partial analysis information table 534 is the same as the configuration of the analysis information table 532.

Figure 35:
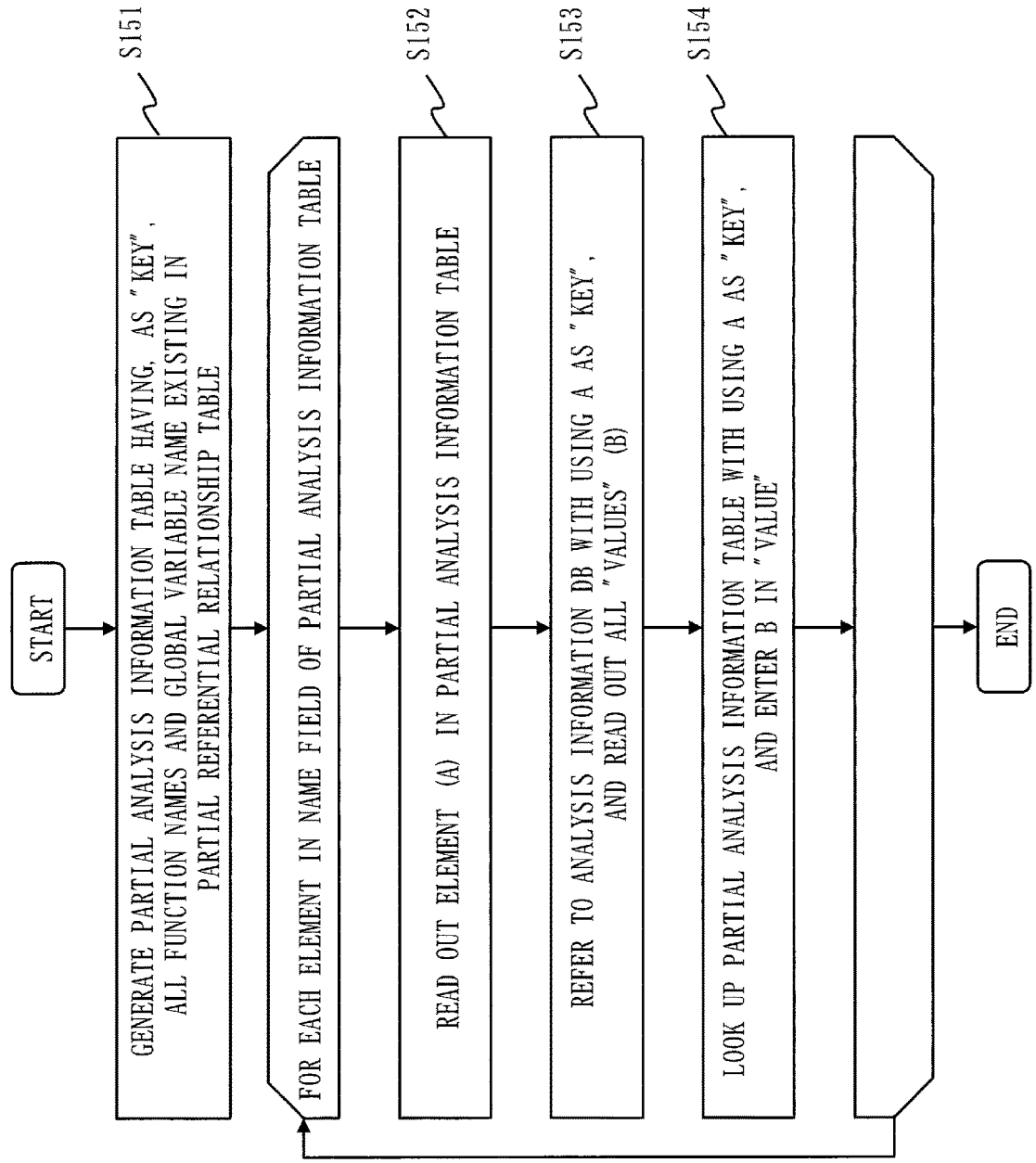
FIG. 35 is a flowchart of an information acquiring process according to Embodiment 5.

An information acquiring process according to Embodiment 5 will be described with referring to FIGS. 35 and 36.

In step S151, the information acquiring unit 63 extracts all the function names and global variable name which are included in the partial referential relationship table 533 generated in step S132. The information acquiring unit 63 enters, in the name fields of the partial analysis information table 534, the extracted function names and global variable name.

The information acquiring unit 63 executes processing from step S152 to step S154 for each element (the function name, the global variable name) being set in the name field of the partial analysis information table 534, as a target.

In step S152, the information acquiring unit 63 reads out a target element from the partial analysis information table 534. The readout element will be referred to as element A. In step S153, the information acquiring unit 63 reads out, from the analysis information table 532, all the values each having element A as "key". The readout value will be referred to as "value B". In step S154, the information acquiring unit 63 enters value B in "value" of a record having, as "key", the element A listed in the partial analysis information table 534.

When the information acquiring process is executed for the split code 32A illustrated in FIG. 29 as input, the partial analysis information table 534 is generated as illustrated in FIG. 36. The partial analysis information table 534 illustrated in FIG. 36 has, as "key", funcA, funcB, funcC, and funcD each being a function related to the split code 32A and g_valA being a global variable related to the split code 32A. Also, value ranges of arguments and value ranges of the return values or global values of these functions and global variable are identified and taken as "value".

As described above, analysis of the split code 32B has been executed. Hence, the value ranges of the arguments of funcA and the ranges of the return values of funcC and funcD are identified. That is, variable value range information that cannot be obtained from only the processing-target split code 32A is identified by analyzing another split code 32 that is not the processing-target split code 32A.

(Step S134 of FIG. 32: Analyzing Process)

The analyzing unit 64 analyzes the processing-target split code 32 with looking up the partial referential relationship table 533 generated in step S132 and the partial analysis information table 534 generated in step S133. In other words, the analyzing unit 64 analyzes the processing-target split code 32 with referring to the value range information indicating a range of values that a variable in the source code 30 can take. The value range information is obtained by analyzing at least one split code 32 among the plurality of split codes excluding the processing-target split code 32.

An analyzing process according to Embodiment 5 will be described with referring to FIGS. 37 and 38.

The analyzing unit 64 executes processing from step S161 to step S169 for each function name being set in the name field of the partial referential relationship table 533, as a target.

In step S161, the analyzing unit 64 reads out a target function name from the partial referential relationship table 533. The readout function name will be referred to as function name A. In step S162, the analyzing unit 64 identifies value range information of individual variables, namely, arguments, a return value, and a global variable that are related to a function expressed by function name A, from the function expressed by function name A and the partial analysis information table 534.

The analyzing unit 64 executes processing from step S163 to step S168 for each line of the function expressed by function name A, as a target. The analyzing unit 64 selects lines as processing targets in ascending order starting from the first line of the function.

In step S163, the analyzing unit 64 determines whether a processing-target line is secure or risky while changing the values of the variables, namely, the arguments, the return value, and the global variable, from the minimum value to the maximum value indicated by the value range information identified in step S162. In step S164, if it is determined that the processing-target line is secure no matter what value each variable may take, the analyzing unit 64 advances the process to step S165. Otherwise, the analyzing unit 64 advances the process to step S166. In step S165, the analyzing unit 64 determines that the processing-target line is secure.

In step S166, if it is determined that the processing-target line is risky no matter what value each variable may take, the analyzing unit 64 advances the process to step S167. Otherwise, the analyzing unit 64 advances the process to step S168. In step S167, the analyzing unit 64 determines that the processing-target line is risky. In step S168, the analyzing unit 64 determines that the processing-target line is unproved.

In step S169, the analyzing unit 64 updates the analysis result in the partial analysis information table 534 by the results determined from step S163 to step S168. The analyzing unit 64 also updates the value ranges of arguments and the value range of the return value or global variable each listed in the partial analysis information table 534, by the value range information identified in step S162.

When the analyzing process is executed for the split code 32A illustrated in FIG. 29 as input, the partial analysis information table 534 is updated as illustrated in FIG. 38. That is, the value ranges of the arguments of funcB and funcC, the ranges of the return values of funcA and funcB, and the analysis results of funcA and funcB, which are not identified in the partial analysis information table 534 illustrated in FIG. 36, become obvious.

Analysis is conducted with utilizing the value ranges of the arguments of funcA and the value range of the return value of funcC, which cannot be known with only the processing-target split code 32A. As a result, analysis results with high analysis accuracy, that is, with a few unproved portions, can be obtained.

(Step S135 of FIG. 32: Information Storing Process)

The information storing unit 65 updates the analysis information table 532 by the partial analysis information table 534 obtained in step S134. Hence, next time executing the process illustrated in FIG. 32, analysis can be performed with utilizing the value range information identified by this process.

*Effect of Embodiment 5*

As described above, the source code analyzing device 50 according to Embodiment 5 analyzes the split code 32 generated by splitting the source code splitting device 10. Hence, analysis can be performed at a higher speed as compared to a case of analyzing the source code 30. Also, the source code analyzing device 50 according to Embodiment 5 performs analysis utilizing the value range information obtained by analyzing another split code 32. Hence, analysis at high analysis accuracy can be performed.

\*\*\*Other Configurations\*\*\*

<Modification 5>

In Embodiment 5, the feature constituent elements are implemented by software. Alternatively, in Modification 5, the feature constituent elements may be implemented by hardware. This Modification 5 will be described regarding differences from Embodiment 5.

Figure 39:
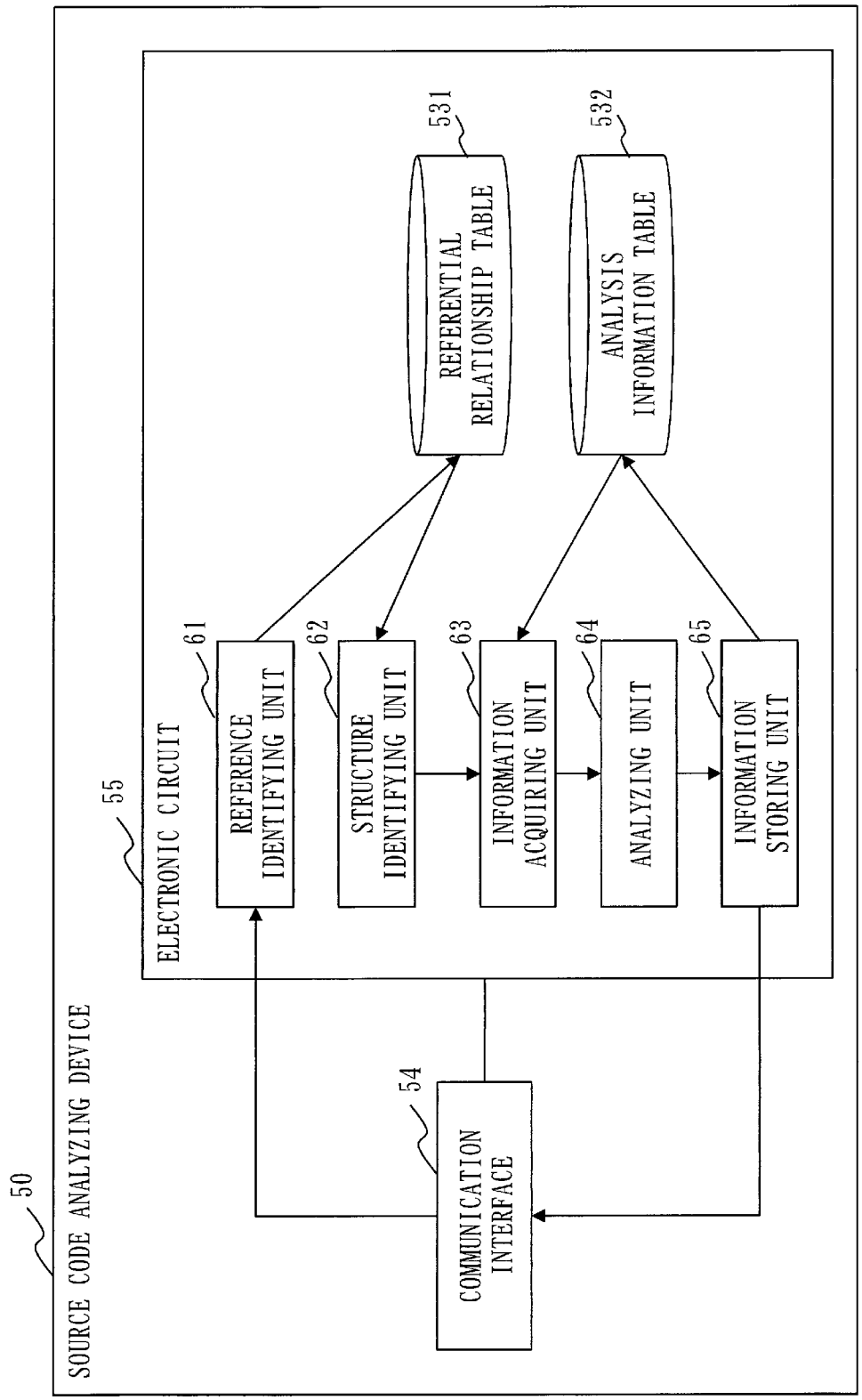
FIG. 39 is a configuration diagram of a source code analyzing device 50 according to Modification 5.

A configuration of a source code analyzing device 50 according to Modification 5 will be described with referring to FIG. 39.

When the feature constituent elements are implemented by hardware, the source code analyzing device 50 is provided with an electronic circuit 55 in place of a processor 51, a memory 52, and a storage 53. The electronic circuit 55 is a dedicated circuit that implements features of the feature constituent elements, the memory 52, and the storage 53.

It is assumed that the electronic circuit 55 is a single circuit, a composite circuit, a programmed processor, a parallel-programmed processor, a logic IC, a gate array (GA), an application specific integrated circuit (ASIC), or a field-programmable gate array (FPGA).

The feature constituent elements may be implemented by one electronic circuit 55, or by distribution over a plurality of electronic circuits 55.

<Modification 6>

In Modification 6, some of feature constituent elements may be implemented by hardware, and the remaining feature constituent elements may be implemented by software.

The processor 51, the memory 52, the storage 53, and the electronic circuit 55 are called processing circuitry. That is, the features of the feature constituent elements are implemented by the processing circuitry.

Embodiment 6

Embodiment 6 is different from Embodiment 5 in that it analyzes only unproved lines. In Embodiment 6, this difference will be described, and a description on the same points will be omitted.

\*\*\*Description of Behavior\*\*\*

Figure 40:
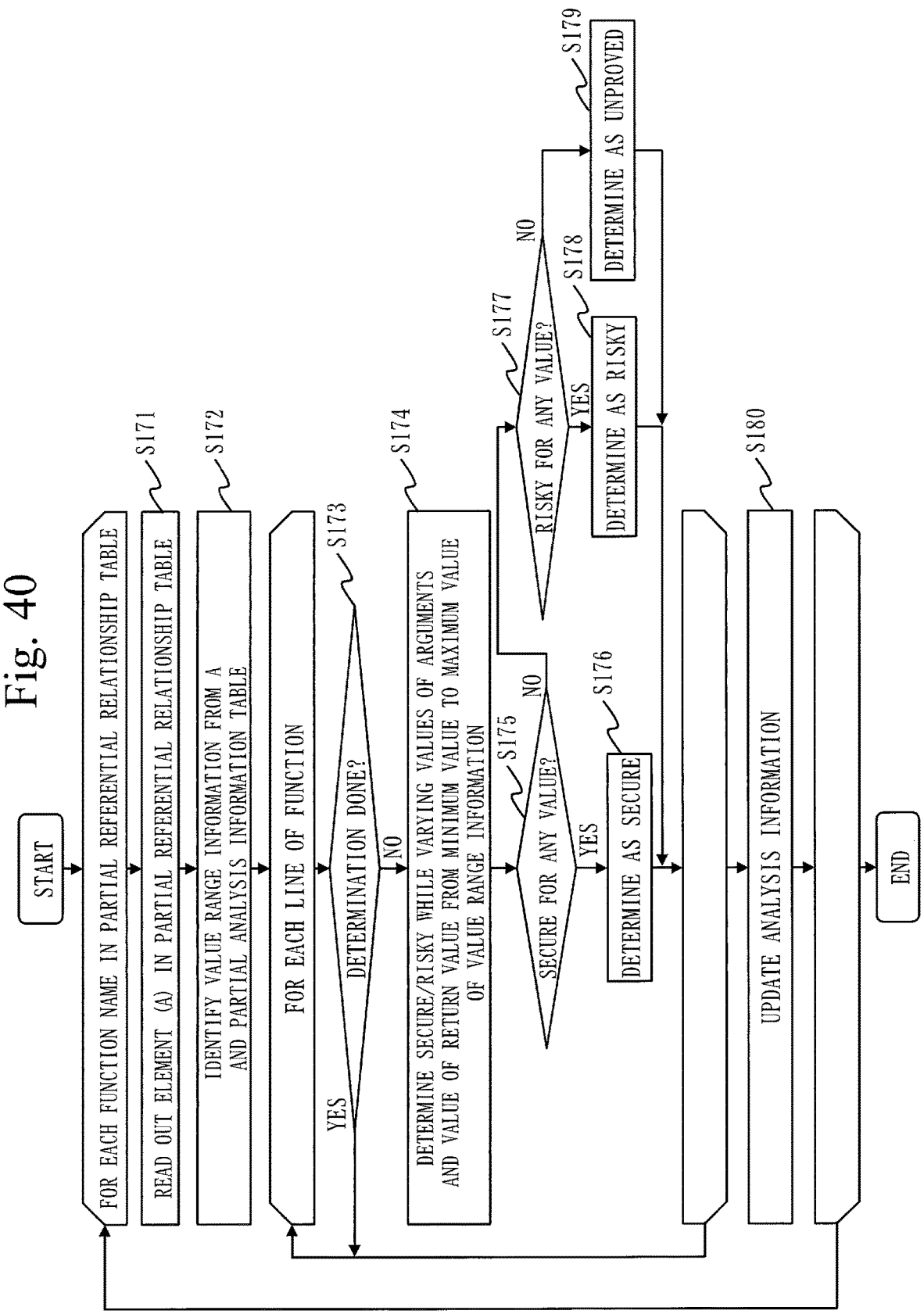
FIG. 40 is a flowchart of an analyzing process according to Embodiment 6.

An analyzing process according to Embodiment 6 will be described with referring to FIG. 40.

Figure 37:
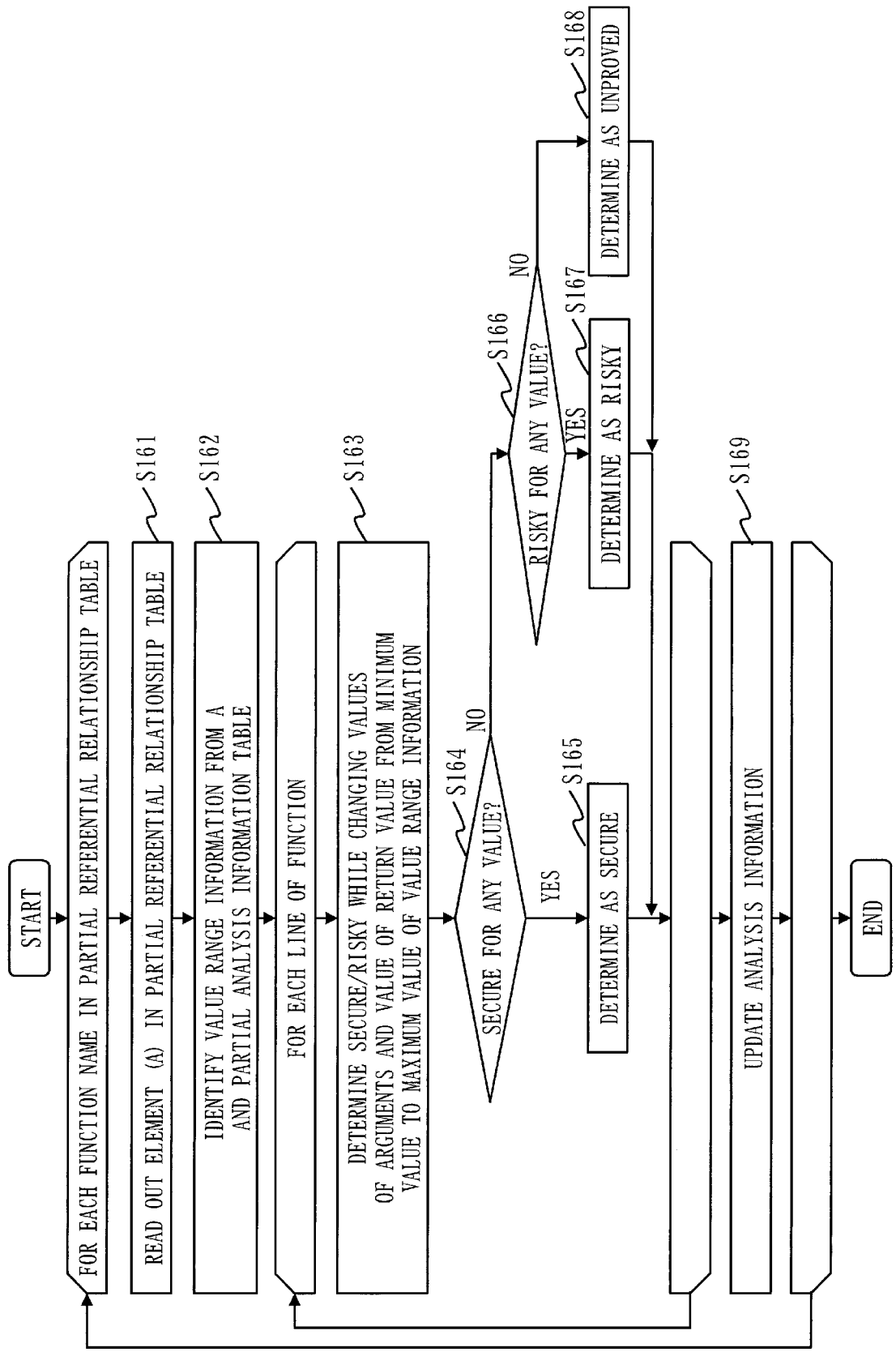
FIG. 37 is a flowchart of an analyzing process according to Embodiment 5.

Processing from step S171 to step S172 is the same as processing from step S161 to step S162 of FIG. 37. In step S173, an analyzing unit 64 determines whether or not determination on a processing-target line is done. That is, the analyzing unit 64 determines whether or not a determination result of secure or risky is obtained. If a determination result of secure or risky is obtained, the analyzing unit 64 judges that the determination is done and increments the line number and takes the next line as the processing target. If a determination result of secure or risky is not obtained yet, the analyzing unit 64 judges that the determination is not done yet and advances the process to step S174.

Processing of step S174 to step S180 is the same as processing from step S163 to step S169 of FIG. 37.

As described above, the source code analyzing device 50 according to Embodiment 6 analyzes only unproved lines. Hence, analysis can be performed at a higher speed than with the source code analyzing device 50 according to Embodiment 5.

Embodiment 7

Processing is repeatedly executed until analysis accuracy of a source code 30 as a whole reaches designated accuracy. This is where Embodiment 7 is different from Embodiments 5 and 6. In Embodiment 7, this difference will be described, and a description on the same points will be omitted.

Embodiment 7 will describe a case where features are added to Embodiment 5. It is also possible to add features to Embodiment 6.

\*\*\*Description of Configuration\*\*\*

Figure 41:
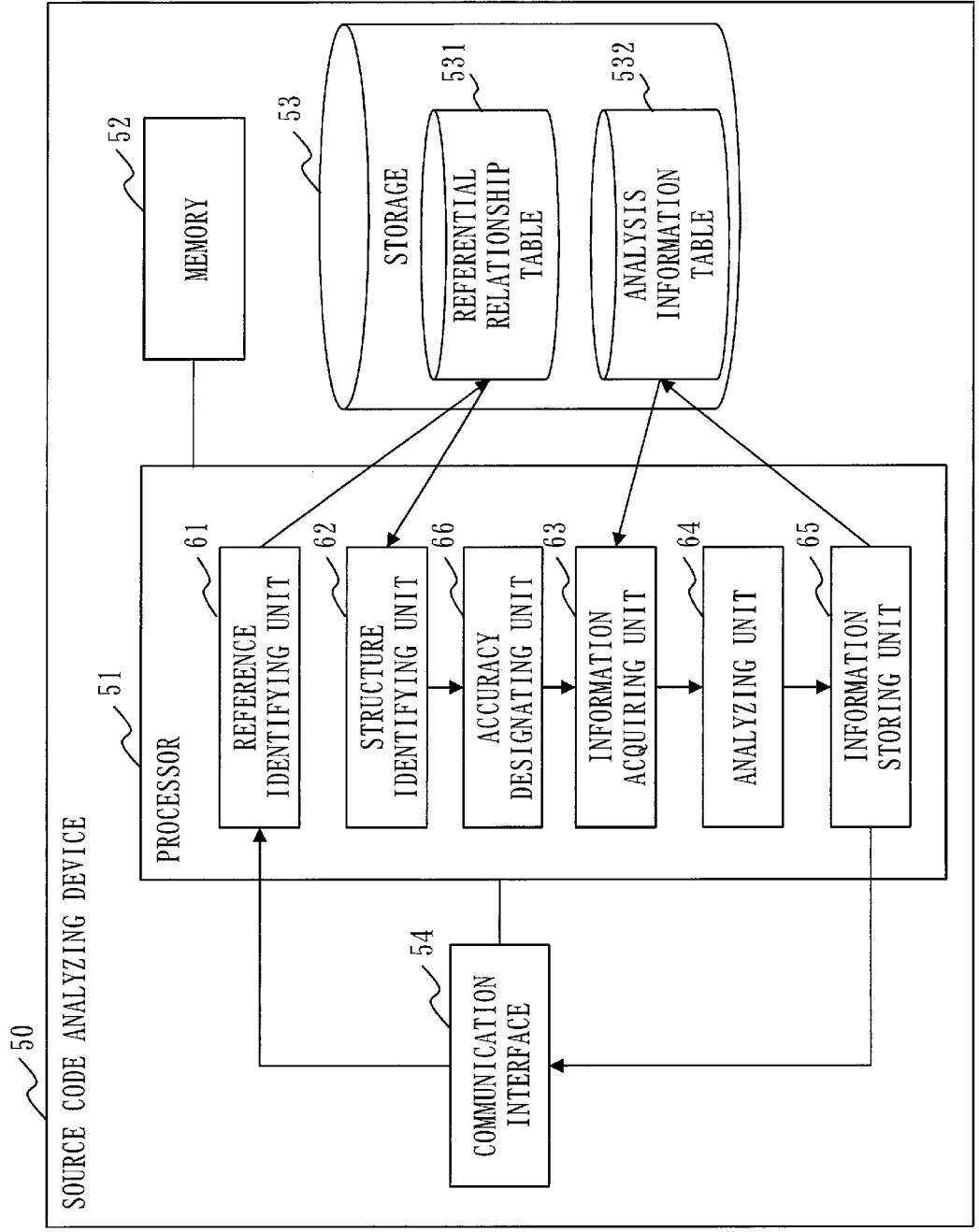
FIG. 41 is a configuration diagram of a source code analyzing device 50 according to Embodiment 7.

A configuration of a source code analyzing device 50 according to Embodiment 7 will be described with referring to FIG. 41.

The source code analyzing device 50 is provided with an accuracy designating unit 66. This is where this source code analyzing device 50 is different from the source code analyzing device 50 illustrated in FIG. 26.

A configuration of an analysis information table 532 according to Embodiment 7 will be described with referring to FIG. 42.

The analysis information table 532 includes analysis accuracy as "value". This is where this analysis information table 532 is different from the analysis information table 532 illustrated in FIG. 27. The analysis accuracy is calculated for each function. The analysis accuracy (%) is calculated by (number of lines determined as secure or risky)/(number of all lines in function)×100.

\*\*\*Description of Behavior\*\*\*

Overall behavior of the source code analyzing device 50 according to Embodiment 7 will be described with referring to FIG. 43.

(Step S181 of FIG. 43: Accuracy Designating Process)

The accuracy designating unit 66 accepts designation of criterion accuracy.

Specifically, the accuracy designating unit 66 accepts, as the criterion accuracy, accuracy being entered by a user operating an input device connected via a communication interface 54.

(Step S182 of FIG. 43: Accuracy Determining Process)

The accuracy designating unit 66 determines whether or not analysis accuracy of the source code 30 as a whole is equal to or higher than the criterion accuracy accepted in step S181. If the analysis accuracy is equal to or higher than the criterion accuracy, the accuracy designating unit 66 ends the process. If the analysis accuracy is less than the criterion accuracy, the accuracy designating unit 66 advances the process to step S183.

The analysis accuracy of the source code 30 as a whole may be equal to an average value of analysis accuracy of all the functions in the source code 30, or may be calculated by (number of lines determined as secure or risky in source code 30)/(number of all lines in source code 30)×100.

Processing from step S183 to step S187 is the same as processing from step S131 to step S135 of FIG. 32.

That is, if the analysis accuracy is less than the criterion accuracy, a new split code 32 is accepted in step S183 as an analysis processing target, and the analysis is continued.

As described above, the source code analyzing device 50 according to Embodiment 7 repeatedly executes the process for the new split code 32 as a target until the analysis accuracy of the source code 30 as a whole reaches the designated accuracy. Hence, it is possible to reduce the cumbersome operations of repeating the analysis manually.

Embodiment 8

Process is repeatedly executed until analysis accuracy of a designated module reaches designated accuracy. This is where Embodiment 8 is different from Embodiment 7. In Embodiment 8, this difference will be described, and a description on the same points will be omitted.

\*\*\*Description of Behavior\*\*\*

Overall behavior of a source code analyzing device 50 according to Embodiment 8 will be described with referring to FIG. 44.

(Step S191 of FIG. 44: Accuracy Designating Process)

An accuracy designating unit 66 accepts designation of a module and designation of criterion accuracy.

Specifically, the accuracy designating unit 66 takes a module being entered by a user operating an input device connected via a communication interface 54, as a designated module, and accepts accuracy as the criterion accuracy.

(Step S192 of FIG. 44: Accuracy Determining Process)

The accuracy designating unit 66 determines whether or not analysis accuracy of the designated module accepted in step S191 is equal to or more than the criterion accuracy accepted in step S191. If the analysis accuracy is equal to or more than the criterion accuracy, the accuracy designating unit 66 ends the process. If the analysis accuracy is less than the criterion accuracy, the accuracy designating unit 66 advances the process to step S193.

A module is one or more functions. When the designated module includes a plurality of functions, the analysis accuracy of the designated module may be equal to an average value of analysis accuracy of all the functions included in the designated module, or may be calculated by (number of lines determined as secure or risky in designated module)/(number of all lines in designated module)×100.

Processing from step S193 to step S197 is the same as processing from step S183 to step S187 of FIG. 43.

That is, if the analysis accuracy of the designated module is less than the criterion accuracy, a new split code 32 is accepted in step S193 as an analysis processing target, and the analysis is continued.

As described above, the source code analyzing device 50 according to Embodiment 8 repeatedly executes the process for the new split code 32 as the target until the analysis accuracy of the designated module reaches the designated accuracy. Hence, it is possible to reduce the cumbersome operations of repeating the analysis manually.

REFERENCE SIGNS LIST

10: source code splitting device; 11: processor; 12: memory; 13: storage; 14: communication interface; 15: electronic circuit; 21: dependency identifying unit; 22: influence identifying unit; 23: splitting unit; 24: global variable identifying unit; 30: source code; 31: function; 32: split code; 41: declaration type bit number table; 42: argument information table; 43: argument influence table; 44: graph; 45: splitting table; 46: global variable table; 47: global variable influence table; 48: integral influence table; 49: processing method table.

The invention claimed is:

1. A source code splitting device comprising:
processing circuitry
to identify, for each of two functions included in a source code as a target, influence degrees exerted over analysis of the source code when the two target functions are each split into separate split codes, as analysis influence degrees between the two target functions, from information amounts passed between the two target functions, wherein each information amount passed between the two functions is a bit number of at least either one of an argument and a return value between the two functions, and wherein an analysis influence degree is a sum of the bit numbers, and
to split the source code into a plurality of split codes based on the identified analysis influence degrees.

2. The source code splitting device according to claim 1, wherein the processing circuitry splits the source code into a designated number of split codes such that a sum value of the analysis influence degrees between the functions each being split into the separate codes decreases.

3. The source code splitting device according to claim 1, wherein an information amount passed between the two functions is a bit number of a global variable the two target functions commonly refer to.

4. The source code splitting device according to claim 1, wherein the processing circuitry identifies the analysis influence degrees between the two target functions based on an analysis influence degree between a called function out of the two target functions, and another function.

5. The source code splitting device according to claim 1, wherein the processing circuitry identifies the analysis influence degrees between the two target functions based on a number of times of reference of the information passed between two target functions.

6. The source code splitting device according to claim 1, wherein the processing circuitry identifies the analysis influence degrees between the two target functions based on a processing content that uses the information passed between the two target functions.

7. A source code analyzing device comprising:
processing circuitry
to analyze, for one split code as a processing-target split code, among the plurality of split codes being split by the source code splitting device according to claim 1, the processing-target split code with referring to value range information indicating a range of values that a variable in the source code can take, the value range information being obtained by analyzing at least one split code among the plurality of split codes excluding the processing-target split code.

8. The source code analyzing device according to claim 7, wherein the value range information indicates a range of values that a value of an argument of a function included in a source code can take, a range of values that a value of a return value of the function included in the source code can take, and a range of values that a value of a global variable included in the source code can take.

9. The source code analyzing device according to claim 7, wherein the processing circuitry performs secure or risky analysis for each line of the processing-target split code.

10. The source code analyzing device according to claim 9, wherein the processing circuitry performs the secure or risky analysis for only lines, in the processing-target split code, for which a secure/risk analysis result is not obtained yet.

11. The source code analyzing device according to claim 9, wherein the processing circuitry repeats a process of analyzing, as a processing-target split code, one split code among the plurality of split codes until a proportion of lines for which the analysis result is obtained to all of lines in the source code reaches equal to or more than criterion accuracy.

12. The source code analyzing device according to claim 9,
wherein the processing circuitry repeats a process of analyzing, as a processing-target split code, one split code among the plurality of split codes until a proportion of lines for which the analysis result is obtained to all of lines in a target function included in the source code reaches equal to or more than criterion accuracy.

13. A source code splitting method comprising:
identifying, for each of two functions included in a source code as a target, influence degrees exerted over analysis of the source code when the two target functions are each split into separate split codes, as analysis influence degrees between the two target functions, from information amounts passed between the two target functions, wherein each information amount passed between the two functions is a bit number of at least either one of an argument and a return value between the two functions, and wherein an analysis influence degree is a sum of the bit numbers; and splitting the source code into a plurality of split codes based on the analysis influence degrees.

14. A non-transitory computer-readable medium storing a source code splitting program comprising:
an influence identifying process of identifying, for each of two functions included in a source code as a target, influence degrees exerted over analysis of the source code when the two target functions are each split into separate split codes, as analysis influence degrees between the two target functions, from information amounts passed between the two target functions, wherein each information amount passed between the two functions is a bit number of at least either one of an argument and a return value between the two functions, and wherein an analysis influence degree is a sum of the bit numbers; and
a splitting process of splitting the source code into a plurality of split codes based on the analysis influence degrees identified by the influence identifying process.

* * * * *